United States Patent
Nakano et al.

(10) Patent No.: US 10,433,182 B2
(45) Date of Patent: Oct. 1, 2019

(54) COMMUNICATION SYSTEM AND WIRELESS NETWORK ENGINEERING SUPPORT METHOD

(71) Applicant: HITACHI, LTD., Tokyo (JP)

(72) Inventors: Ryo Nakano, Tokyo (JP); Takuma Nishimura, Tokyo (JP); Hirotaka Moribe, Tokyo (JP); Shinichi Tsunoo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/309,023

(22) PCT Filed: Mar. 21, 2017

(86) PCT No.: PCT/JP2017/011195
§ 371 (c)(1),
(2) Date: Dec. 11, 2018

(87) PCT Pub. No.: WO2017/217058
PCT Pub. Date: Dec. 21, 2017

(65) Prior Publication Data
US 2019/0261191 A1    Aug. 22, 2019

(30) Foreign Application Priority Data

Jun. 13, 2016 (JP) ................ 2016-117472

(51) Int. Cl.
*H04W 16/00* (2009.01)
*H04W 16/18* (2009.01)
(Continued)

(52) U.S. Cl.
CPC ............. *H04W 16/18* (2013.01); *H04B 7/14* (2013.01); *H04L 41/0806* (2013.01); *H04W 64/00* (2013.01); *H04W 88/16* (2013.01)

(58) Field of Classification Search
CPC ..... H04W 16/18; H04W 64/00; H04W 88/16; H04B 7/14; H04L 41/0806
See application file for complete search history.

(56) References Cited

U.S. PATENT DOCUMENTS

2004/0236547 A1* 11/2004 Rappaport ............ G06F 17/509
703/2
2006/0056329 A1    3/2006 Ookuma
(Continued)

FOREIGN PATENT DOCUMENTS

JP    2005-203991 A    7/2005
JP    4420218 B2    12/2009

OTHER PUBLICATIONS

International Search Report for PCT/JP2017/011195, dated Apr. 18, 2017.

*Primary Examiner* — Khai N Nguyen
(74) *Attorney, Agent, or Firm* — Volpe and Koenig, P.C.

(57) ABSTRACT

A network management device manages a wireless multi-hop network; a network configuration management unit that manages communication quality information between wireless devices and between the wireless devices and the gateway; a repeater necessity determination unit that determines whether to add a repeater for each of the wireless devices based on the communication quality information and selects the wireless device that is required to add the repeater based on a determination result; an access point determination unit determines access points for securing a predetermined communication quality for the wireless device selected; and a repeater placement determination unit that determines whether there is a repeater installation location indicating an installation range of the repeater for relaying the wireless device selected and the access point selected by the access point determination unit based on a
(Continued)

communication range of the wireless device selected and a communication range of the access point selected.

15 Claims, 15 Drawing Sheets

(51) Int. Cl.
*H04L 12/24* (2006.01)
*H04B 7/14* (2006.01)
*H04W 64/00* (2009.01)
*H04W 88/16* (2009.01)

(56) References Cited

U.S. PATENT DOCUMENTS

| | | | |
|---|---|---|---|
| 2008/0018817 A1 | 1/2008 | Kuo | |
| 2013/0065516 A1* | 3/2013 | Asaoka | H04W 24/02 455/25 |
| 2014/0341061 A1* | 11/2014 | Shinada | H04W 16/18 370/252 |

* cited by examiner

| MEASUREMENT SOURCE | MEASUREMENT DESTINATION | RECORD TIME | COMMUNICATION QUALITY |
|---|---|---|---|
| A | GW | 20160222081030 | −65 |
| A | B | 20160222081035 | −70 |

FIG. 13
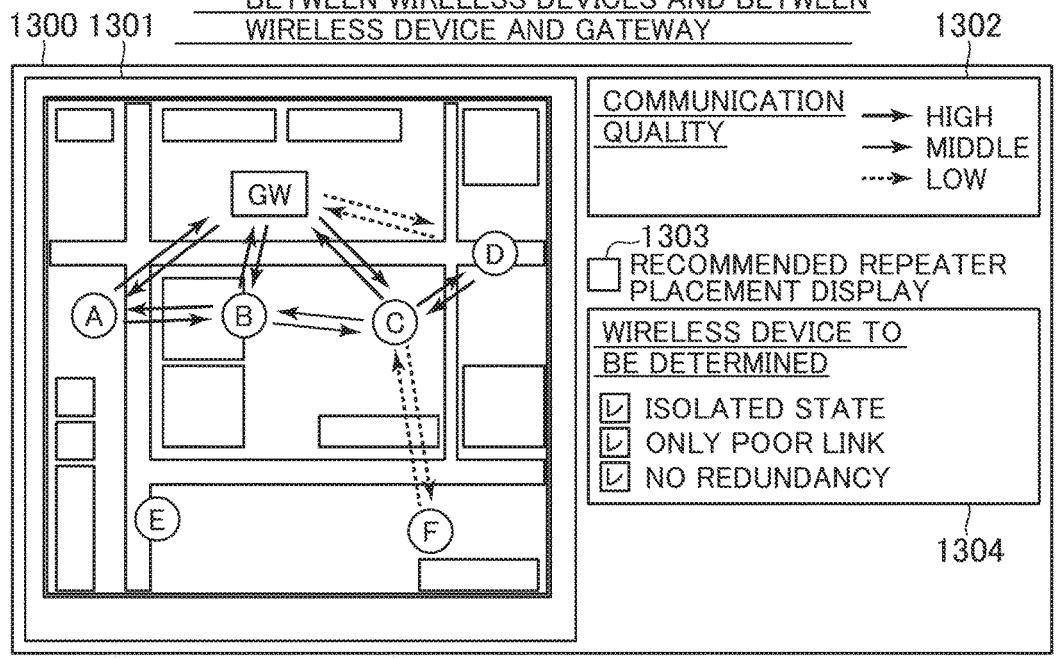
(a) COMMUNICATION QUALITY DISPLAY BETWEEN WIRELESS DEVICES AND BETWEEN WIRELESS DEVICE AND GATEWAY
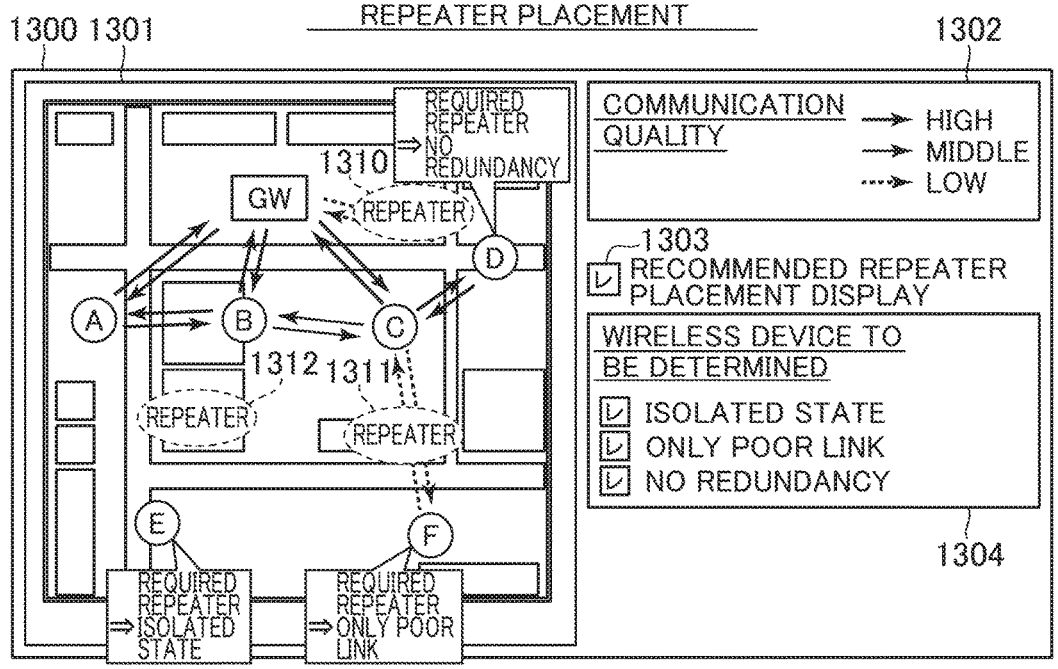
(b) DISPLAY OF RECOMMENDED REPEATER PLACEMENT

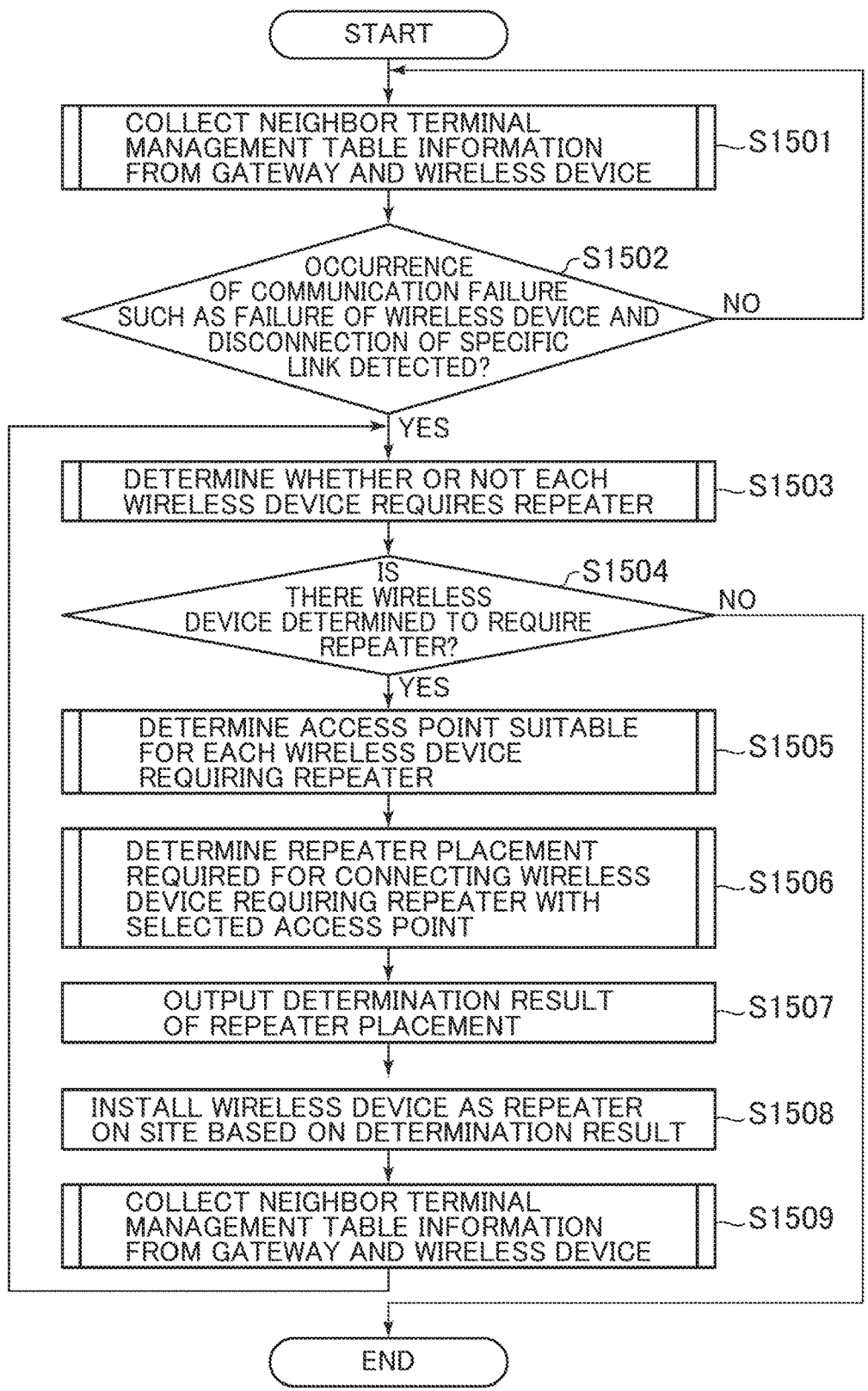

COMMUNICATION SYSTEM AND WIRELESS NETWORK ENGINEERING SUPPORT METHOD

TECHNICAL FIELD

The present invention relates to a communication system for managing a wireless network and a wireless network engineering support method.

BACKGROUND ART

With the diversification of network usage, the introduction of a communication system having a form for collecting data through a communication between wireless devices has been advanced, in which multiple wireless devices are accommodated under a gateway to configure a wireless multi-hop network. However, there is a case in which even if a wireless device is installed on a site, the wireless device cannot communicate with another wireless device due to radio shielding caused by an obstacle or the like, or there is a case in which even if the communication is enabled, a communication quality is poor and a desired communication requirement cannot be achieved. In such a case, in order to secure a communication connection and stabilize the communication quality, an engineering work is required to add a wireless device as a repeater at an appropriate location.

As a prior art for determining an installation location of the repeater, there is a technique (Patent Literature 1) that detects wireless devices connectable with one hop in each predetermined installation location candidates of a repeater, and determines the good installation location of an repeater from the candidates based on detection results (Patent Literature 1). In the above prior art, a location connectable with one hop to both of a wireless device having a communication path leading to a gateway and a wireless device which is in an isolated state is selected from the installation location candidates and employed as an actual installation location of a repeater. The above processing is repeated until there are no isolated wireless devices, thereby being capable of determining the placement of the repeater which obtains a communication route through which all of desired wireless devices reach the gateway.

CITATION LIST

Patent Literature

Patent Literature 1: Japanese Patent No. 4420218

SUMMARY OF INVENTION

Technical Problem

However, in the method requiring information on the installation location candidates of the repeater as disclosed in Patent Literature 1, work for selecting multiple installation location candidates in advance is required. For example, in the case where the repeater is driven by a power supply, it is conceivable to narrow down power suppliable locations as candidates. In the case where there is a degree of freedom in the installation location, such as in the case of the battery driving, there is a need to consider appropriate installation location candidates for the repeater while taking radio wave propagation characteristics and the like on a site into consideration. In addition, in the case where there is no appropriate installation location in the selected candidates, the installation location candidates are required to be reselected. Further, since there is required work that install the wireless devices in each installation location candidates of a repeater and detect the wireless device connectable by one hop, if a large number of candidate points are present, the detection work also involves time and labor.

The present invention has been made in view of the above problems, and it is an object of the present invention to provide a communication system and a wireless network engineering support method which are capable of calculating an installation location of a repeater based on information for managing a wireless network without requiring advance information on installation location candidates of the repeater.

Solution to Problem

In order to solve the above problem, the present invention provides the following configuration.

A communication system includes a plurality of wireless devices, a gateway that transmits and receives information with respect to each of the wireless devices, and a network management device that manages a wireless multi-hop network including the wireless devices and the gateway, the network management device including: a network configuration management unit that manages communication quality information between the wireless devices and between the wireless devices and the gateway; a repeater necessity determination unit that determines whether or not to add a repeater for each of the wireless devices based on the communication quality information and selects the wireless device that is required to add the repeater based on a determination result; an access point determination unit that determines access points for securing a predetermined communication quality for the wireless device selected by the repeater necessity determination unit based on the communication quality information or positional information of the wireless devices and the gateway to select the access point from the wireless devices or the gateway based on the determination result; and a repeater placement determination unit that determines whether there is a repeater installation location indicating an installation range of the repeater for relaying the wireless device selected by the repeater necessity determination unit and the access point selected by the access point determination unit based on a communication range of the wireless device selected by the repeater necessity determination unit and a communication range of the access point selected by the access point determination unit.

Advantageous Effect of Invention

According to the present invention, the installation location of the repeater can be calculated based on the information for managing the wireless network without requiring advance information on the installation location candidates of the repeater in the wireless multi-hop network.

BRIEF DESCRIPTION OF DRAWINGS

FIG. 5 is a configuration diagram of a peripheral terminal management table held by a wireless device and a gateway according to the first embodiment.

FIGS. 13A and 13B are illustrative diagrams showing display examples of communication quality information and a repeater placement determination result according to the first embodiment.

FIG. 15 is a flowchart showing overall processing of a wireless network engineering support related to a communication trouble countermeasure according to a third embodiment.

DESCRIPTION OF EMBODIMENTS

Figure 1:
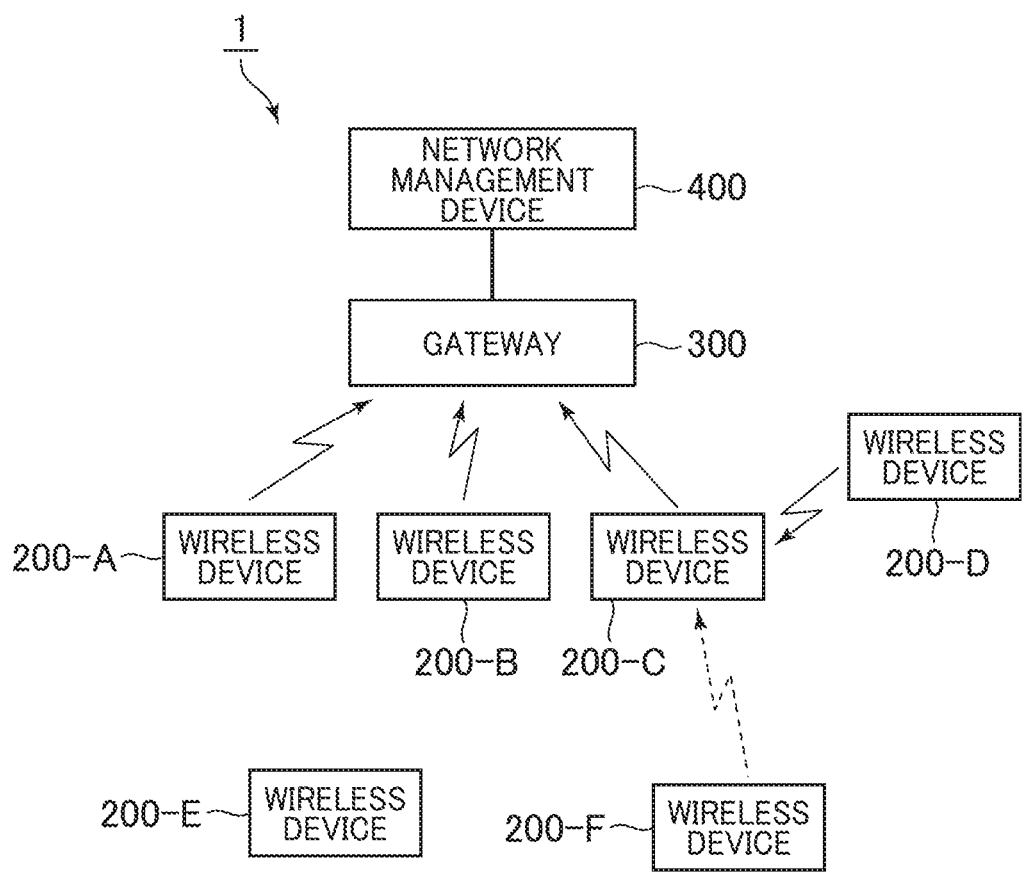
FIG. 1 is a block diagram illustrating a configuration of a communication system according to a first embodiment.

First, a principle (outline) of the present invention will be described. It is assumed that a wireless device and gateway manage information of neighbor terminal that can directly communicate with the subject wireless device with one hop (no repeater) and communication quality information with the neighbor terminal. Hereinafter, a table used for this management will be referred to as a neighbor terminal management table.

The network management device collects information of the neighbor terminal management table from the wireless devices and the gateway and manages the communication quality information between the wireless devices and between the wireless device and the gateway by the network configuration management unit. Next, the repeater necessity determination unit determines whether to add the repeater for each wireless device based on the management information in the network configuration management unit. In this case, in a communication connection of the wireless devices which cannot satisfy a predetermined communication requirement, it is determined that there is a need to add the repeater for the wireless device having no given redundancy. In particular, the following wireless devices are determined as wireless devices required to add the repeater.
(1) A wireless device that is in an isolated state in which there is no neighbor terminal directly communicable by one hop.
(2) A wireless device having no neighbor terminal which is directly communicable by one hop and whose communication quality is equal to or higher than a threshold value.
(3) A wireless device having one or more neighbor terminals which are directly communicable by one hop and whose communication quality is equal to or more than the threshold value, but the number of which is less than N (N is any value of 1 or more).

Subsequently, in order to ensure the communication connection and to improve and stabilize the communication quality for each wireless device that is determined to require the addition of the repeater, the wireless device or the gateway, which is an appropriate access point, is determined by an access point determination unit of the network management device. More specifically, the access point is determined for the wireless device determined to require the addition of the repeater under the above conditions (1) to (3) based on the following criteria (A) to (C).
(A) The closest wireless device or gateway.
(B) The wireless device or the gateway with the highest communication quality among the neighbor terminals which are directly communicable by one hop.
(C) In the case of the above state (1) when excluding the neighbor terminals which are directly communicable by one hop and whose communication quality is equal to or more than the threshold value, the criterion (A) is applied, and in the case of the above state (2), the criterion (B) is applied.

The installation location of the repeater required for connecting each wireless device determined to require the repeater by the repeater necessity determination unit to the access point selected by the access point determination unit is determined by a repeater placement determination unit of the network management device. More specifically, communication ranges expected for both of the wireless device determined to require the repeater and the access point are calculated, and an overlapping portion of those communication ranges is determined as a recommended installation location of the repeater. Thereafter, the determination result is output as the recommended repeater placement location through a display unit of the network management device.

In this manner, the repeater necessity and the appropriate access point of each wireless device, and the repeater placement are determined based on the communication quality information between the wireless devices and between the wireless device and the gateway, thereby being capable of calculating and providing the recommended installation location of the repeater without requiring advance information on the installation location candidates of the repeater. In addition, since no work for actually installing the wireless devices for all of the repeater installation location candidates to detect the wireless devices connectable by one hop is also required, a work load pertaining to a placement design of the repeater can be reduced.

A work support for a wireless network engineering relating to a repeater placement design according to embodiments of the present invention will be described with reference to FIGS. 1 to 16. A first embodiment will be described with reference to FIGS. 1 to 13, a second embodiment will be described with reference to FIG. 14, and a third embodiment will be described with reference to FIG. 15.

First Embodiment

A first embodiment shows a basic form of work support for a wireless network engineering related to a repeater placement design. First, a configuration of a communication system, wireless devices and a gateway, and a network management device will be described with reference to FIGS. 1 to 4. Next, a neighbor terminal management table will be described with reference to FIG. 5. Then, a process for supporting the wireless network engineering related to the repeater placement design in the network management device and an operation example of the wireless network engineering support will be described with reference to FIGS. 6 to 12. Further, a display example relating to communication quality information and a determination result of the repeater placement design will be described with reference to FIG. 13.

The configuration of the communication system will be described with reference to FIG. 1. FIG. 1 is a block diagram illustrating the configuration of the communication system according to the first embodiment. In FIG. 1, a communication system 1 includes multiple wireless devices 200 (200-A to 200-F), a gateway 300, and a network management device 400. Collected data acquired by the wireless devices 200, such as sensor values, is transmitted to the gateway 300 by a wireless communication. At that time, when one wireless device 200 cannot communicate directly with the gateway 300, the data is transmitted to the gateway in a bucket brigade manner by relaying other wireless devices 200 by a wireless multi-hop communication. Then, the gateway 300 transfers the data collected from the wireless device 200 to the network management device 400. FIG. 1 illustrates a case in which the gateway 300 is connected to the network management device 400 in a wired or wireless manner. Alternatively, the function of the network management device 400 may be integrated into the gateway 300 and provided as one device without separating the gateway 300 and the network management device 400 from each other.

In FIG. 1, a link in which the communication quality is poor and a predetermined communication requirement cannot be achieved is exemplified by a dotted line, and the wireless device 200-F can communicate with the wireless device 200-C but cannot achieve the communication requirement. Also, the wireless device 200-E cannot achieve the communication requirement because there are no communicable wireless devices in the periphery. For those wireless devices, there is a need to add a repeater at an appropriate location to ensure a stable communication connection. In the present embodiment, the installation location of the repeater is calculated through a procedure shown in FIG. 6.

Figure 2:
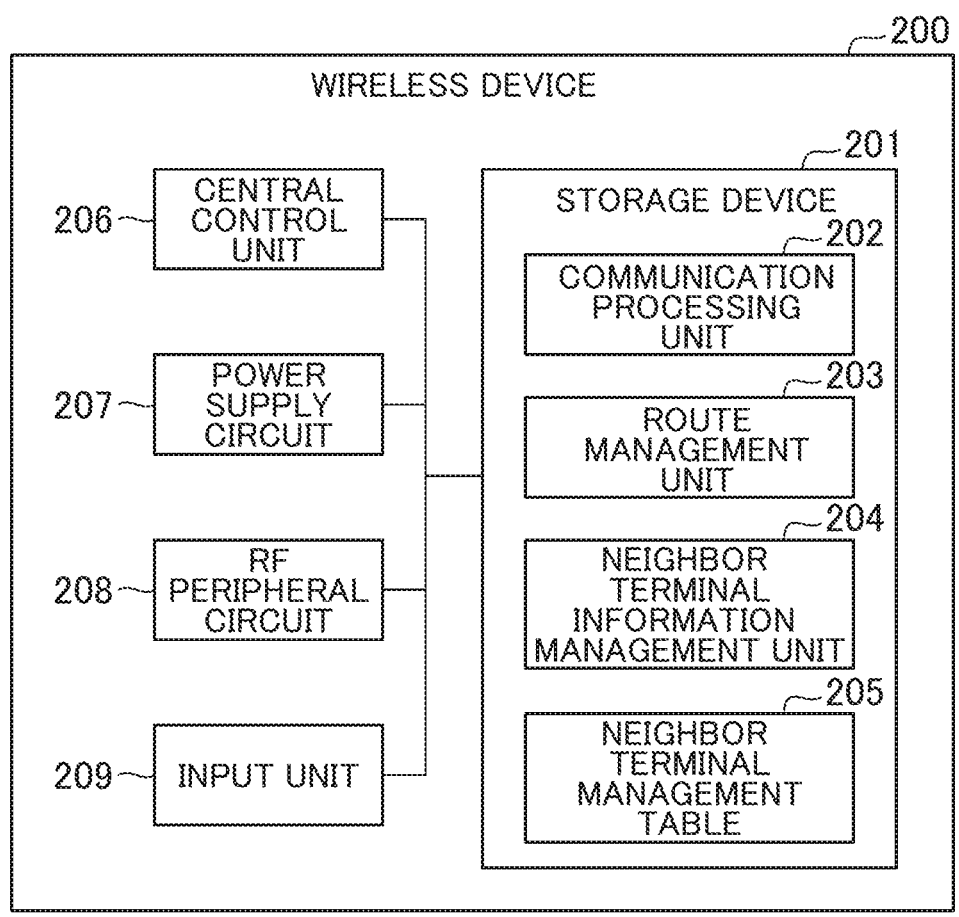
FIG. 2 is a hardware block diagram of a wireless device according to the first embodiment.

Referring to FIG. 2, a hardware block diagram of a wireless device will be described. FIG. 2 is a hardware block diagram of the wireless devices in the first embodiment. The wireless device 200 is an embedded device having a communication function with the gateway 300 or another wireless device 200.

Referring to FIG. 2, the wireless device 200 includes a storage device 201, a central control unit 206, a power supply circuit 207, a radio frequency (RF) peripheral circuit 208, and an input unit 209. The storage device 201 includes a communication processing unit 202, a route management unit 203, a neighbor terminal information management unit 204, and a neighbor terminal management table 205. The communication processing unit 202 realizes transmission and reception processing in communication. Specifically, the communication processing unit 202 performs a packet assembly process such as designation of a transmission destination at the time of transmission, and a packet analysis process such as determination as to whether or not a packet is addressed to its own terminal at the time of reception. The route management unit 203 manages route information on a communication within the network.

The neighbor terminal information management unit 204 manages information related to other wireless devices 200 and the gateway 300 existing in a communication range of the wireless device 200 and information on a communication quality with each communication partner (communication target). The neighbor terminal information management unit 204 performs an update process of the neighbor terminal management table 205, a notification process of neighbor terminal information, and so on. The storage device 201 includes, for example, a storage device configured by a read-only semiconductor memory or the like, a rewritable semiconductor memory element or the like. The storage device 201 stores a computer program for realizing the various processes described above, data corresponding to management information, and the like.

The central control unit 206 executes various computer programs stored in the storage device 201. As a result, various functions of the wireless device 200 are realized. The power supply circuit 207 supplies an electric power to the wireless device 200, to thereby operate the wireless device 200. The power supply source is not limited to a specific power supply such as an external power source or a battery mounted on the wireless device 200. The RF peripheral circuit 208 includes a transmission unit that converts a digital signal and a wireless signal into each other, converts the generated digital data into the wireless signal, and transmits the converted signal to another wireless device 200 or the gateway 300, and a receiving unit that extracts the digital data from the wireless signal received from the other wireless device 200 or the gateway 300. The input unit 209 receives inputs of measured values and the like from the various sensors or the like connected to the wireless device 200. The wireless device 200 may not be an embedded device but may be an independent device. Further, the wireless device to be added as the repeater is not necessarily provided with all of the configurations in FIG. 2, may be a wireless device having no input unit 209, for example.

Figure 3:
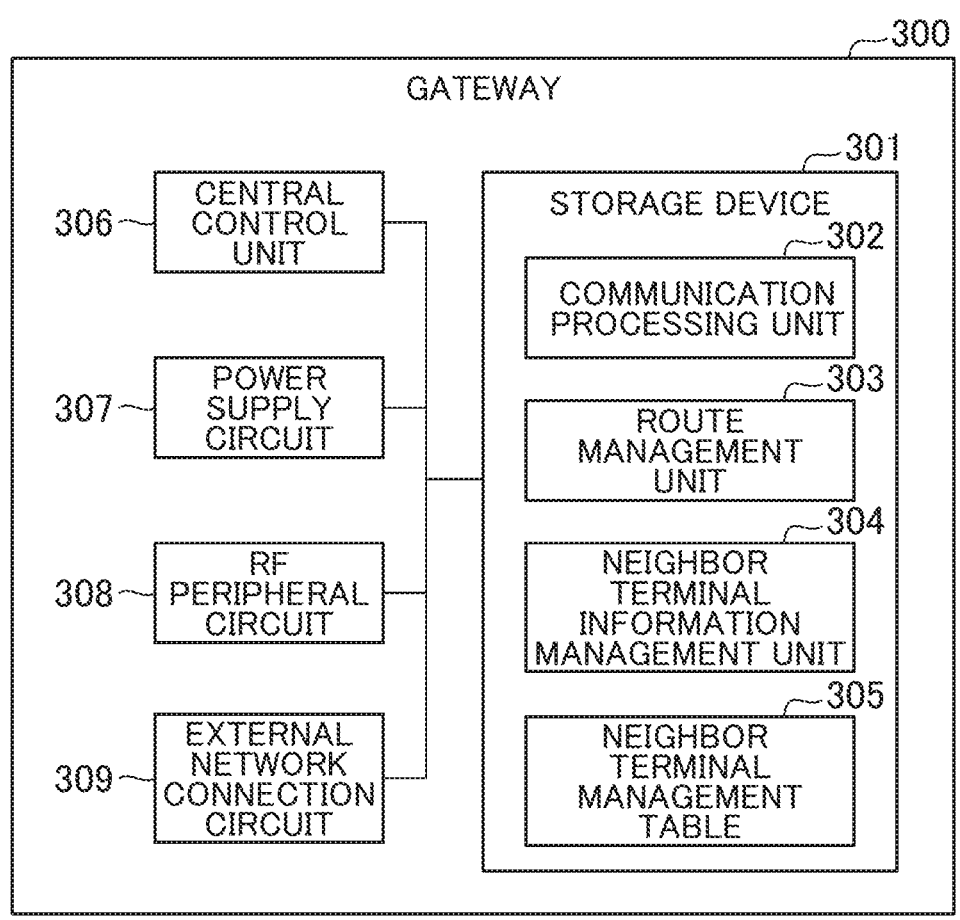
FIG. 3 is a hardware block diagram of a gateway according to the first embodiment.

A hardware configuration of the gateway will be described with reference to FIG. 3. FIG. 3 is a hardware block diagram of the gateway according to the first embodiment. The hardware configuration of the gateway 300 includes an external network connection circuit 309, and has the same configuration as that of the wireless device 200 except that no input unit 209 is provided.

Referring to FIG. 3, the gateway 300 communicates with the wireless device 200 with the use of an RF peripheral circuit 308 and communicates with a network management device 400 with the use of an external network connection circuit 309. The external network connection circuit 309 is a function for using an external network such as an Ethernet (Trademark), WiFi (registered trademark), optical lines, or a telephone network. However, in the case where the network management device 400 is integrated with the gateway 300 and is provided as one device, there is always no need to mount the external network connection circuit 309.

Figure 4:
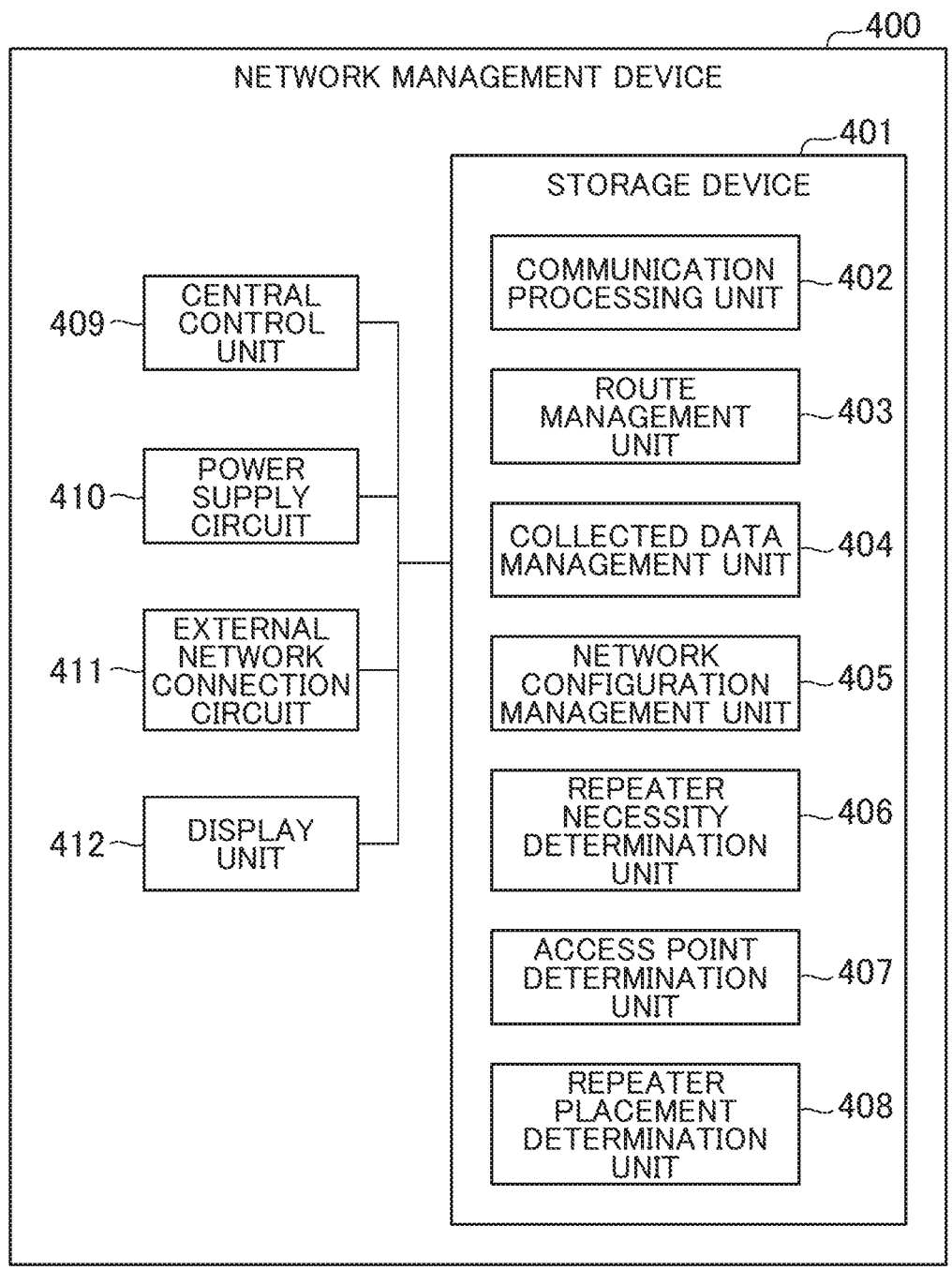
FIG. 4 is a hardware block diagram of a network management device according to the first embodiment.

A hardware configuration of the network management device will be described with reference to FIG. 4. FIG. 4 is a hardware block diagram of the network management device according to the first embodiment. The storage device 401, the communication processing unit 402, the route management unit 403, the central control unit 409, the power supply circuit 410, and the external network connection circuit 411 are the same as those described above.

Referring to FIG. 4, a collected data management unit 404 manages data collected from the wireless device 200, such as sensor values. A network configuration management unit 405 manages and stores the neighbor terminal management tables 205 and 305 of the wireless device 200 and the gateway 300 and manages links between the wireless devices and between the wireless device and the gateway, which are present in the network, and communication qualities (communication quality information) of those components. A repeater necessity determination unit 406 performs a process of determining whether or not the repeater addition (repeater addition necessity) is necessary for each wireless device 200 based on information (information registered in the neighbor terminal management tables 205 and 305) managed by the network configuration management portion 405, and selecting the wireless device 200 required to add the repeater based on the determination result. Further, an access point determination unit 407 performs a process of determining the wireless device 200 or the gateway 300 to be an appropriate access point with respect to the wireless device 200 determined to be required to add the repeater by the repeater necessity determination unit 406. For example, the access point determination unit 407 determines a access point required for securing a predetermined communication quality (a communication quality equal to or more than a threshold value) with respect to the wireless device 200 selected by the repeater necessity determination unit 406 based on the communication quality information or the position information, and selects the access point from the wireless devices 200 or the gateway 300 based on the determination result. The repeater placement determination unit 408 determines the installation location of the repeater, which is required to connect the wireless device 200 determined to be required to add the repeater by the repeater necessity determination unit 406, and the wireless device 200 or the gateway 300 determined as the appropriate access point by the access point determination unit 407. For example, the repeater placement determination unit 408 determines whether or not there is the repeater installation location indicating an installation range of the repeater for relaying the wireless device 200 selected by the repeater necessity determination unit 406 and the access point selected by the access point determination unit 407 based on a communication range of the wireless device 200 selected by the repeater necessity determination unit 406 and a communication range of the access point selected by the access point determination unit 407, and outputs the determination result.

The display unit 412 performs a process of outputting the communication quality between the wireless devices existing in the network, the communication quality between the wireless device and the gateway, the placement location of the repeater determined by the repeater placement determination unit 408. An output screen may be mounted on the network management device 400 or externally connected.

As described above, the functions of the network management device 400 may be integrated into the gateway 300 and integrated as one device. Alternatively, some functions of the network management device 400 may be mounted on the gateway 300.

The neighbor terminal management tables 205 and 305 held by the wireless device 200 and the gateway 300 will be described with reference to FIG. 5. FIG. 5 is a configuration diagram of the neighbor terminal management table held by the wireless device and the gateway according to the first embodiment. The neighbor terminal management tables 205 and 305 shown in FIG. 5 are managed by the neighbor terminal information management units 204 and 304 of the wireless device 200 and the gateway 300, and manages information on neighbor terminals directly communicable with the subject wireless device, which is the wireless device 200 or the gateway 300 existing within the network, and the communication quality with each communication partner (communication target).

A measurement source 501 indicates an identifier of a measurement source of the communication quality, in other words, the wireless device 200 or the gateway 300 that is a management source of the neighbor terminal management table 205 or 305. Specifically, the measurement source 501 is a field describing an address, a host name, and so on of the wireless device 200 and the gateway 300, and the identifier described in the field conforms to a method adopted in the communication system. When an IP address, an MAC address or a unique identifier identifies the wireless device and the gateway, the field may describe those identifiers. In an example of FIG. 5, the identifiers of the wireless devices 200 are indicated by subscript portions in FIG. 1, the identifier of the gateway 300 is indicated as "GW", and the example of FIG. 5 shows the contents of the neighbor terminal management table 205 managed by the wireless device 200-A.

A measurement destination 502 indicates the identifier of the neighbor terminal that can directly communicate with the measurement source 501. That is, in the example of FIG. 5, the wireless device 200-A can directly communicate with the gateway 300 and the wireless device 200-B.

A recording time 503 indicates a time at which the wireless device 200 or the gateway 300 of the measurement source 501 records the communication quality with the neighbor terminal described in the measurement destination 502. In the example of FIG. 5, the recording time is shown in the form of "year, month, date, hour, minute, and second", but other description formats may be used.

A communication quality 504 indicates the communication quality between the wireless device 200 or the gateway 300 of the measurement source 501 and the neighbor terminal described in the measurement destination 502. The example of FIG. 5 shows a received signal strength indicator (hereinafter referred to as "RSSI") when the wireless device 200 or the gateway 300 of the measurement source 501 receives a packet from a neighbor terminal described in the measurement destination 502. Although not shown in FIG. 5, a field for recording arbitrary N times of RSSIs according to a capacity of a storage area may be provided in the neighbor terminal management tables 205 and 305 of the wireless device 200 and the gateway 300. In addition, statistical information such as average values, maximum values, minimum values, and so on observed in the past may be managed by the neighbor terminal management tables 205 and 305, separately. Although RSSI is taken as an example as an index showing the communication quality in FIG. 5, as another index of the communication quality, information such as a packet loss rate may be managed, or multiple communication quality indices may be managed by the neighbor terminal management tables 205 and 305.

Figure 6:
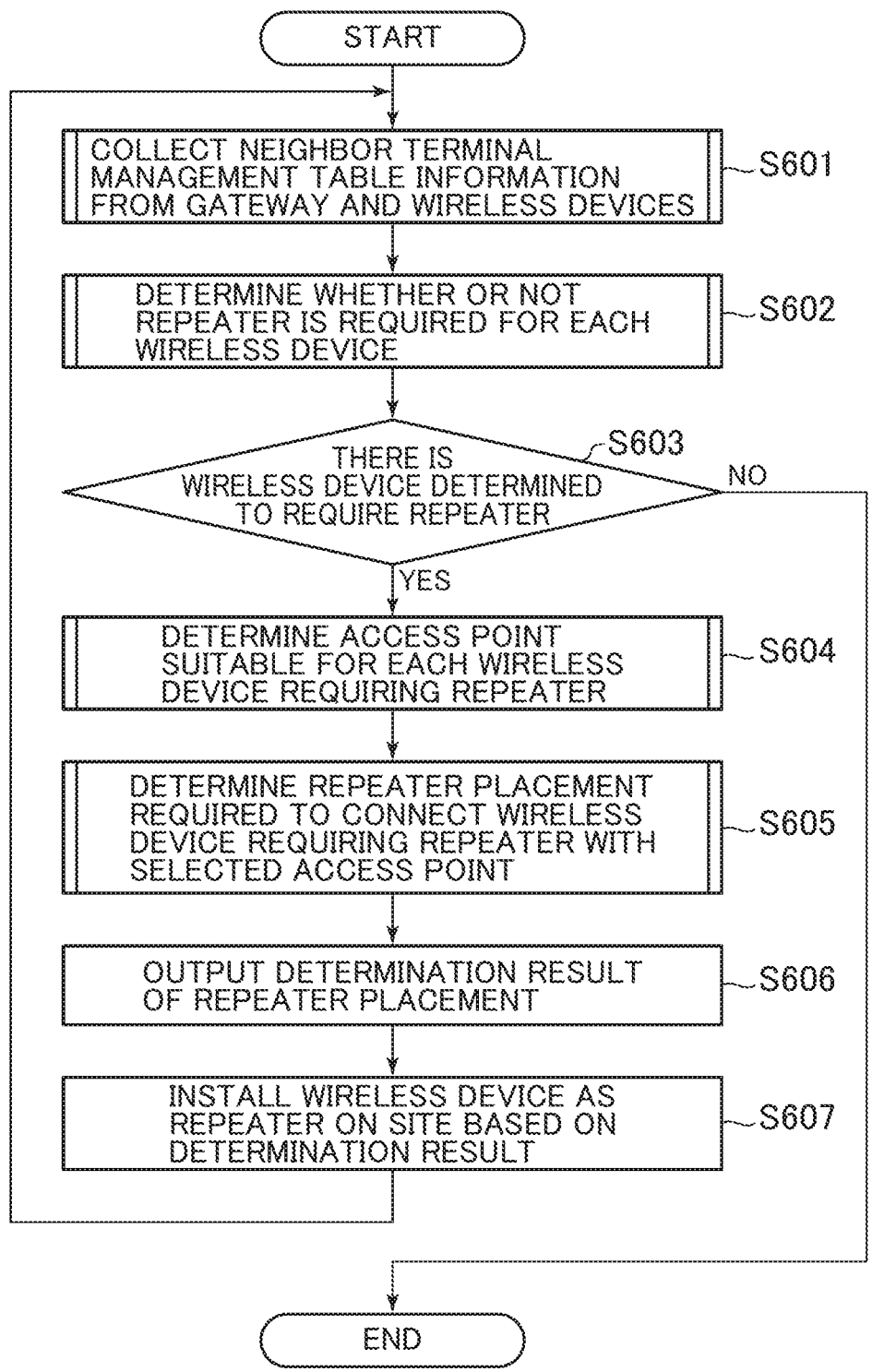
FIG. 6 is a flowchart showing overall processing of a wireless network engineering support related to a repeater placement design according to the first embodiment.

An overall flow of the wireless network engineering support relating to repeater placement design by the network management device will be described with reference to FIG. 6. FIG. 6 is a flowchart showing the overall processing of the wireless network engineering support related to repeater placement design according to the first embodiment. The network management device 400 determines whether to add the repeater for each wireless device 200 based on the information on the neighbor terminal management tables 205 and 305 collected from each wireless device 200 and the gateway 300 according to processing in FIG. 6. The network management device 400 then determines the wireless device 200 or the gateway 300 to be an appropriate access point with respect to the wireless device 200 determined to require the repeater. Thereafter, the network management device 400 determines the installation location of the repeater required to connect the wireless device determined to require the repeater and the access point, and displays the determination result as a recommended repeater installation location through the display unit 412.

Referring to FIG. 6, in Step S601, the network configuration management unit 405 collects information on the neighbor terminal management tables 205 and 305 from the gateway 300 and the wireless device 200. Details of the collection process in Step S601 will be described later with reference to FIG. 7. With the collection of the neighbor terminal management tables 205 and 305 held by the gateway 300 and the wireless device 200, the network management device 400 enables the network configuration management unit 405 to manage the neighbor terminals communicable with the gateway 300 and the wireless device 200 and the respective communication qualities as network configuration information. Upon completion of the process in Step S601, the process proceeds to Step S602.

In Step S602, the repeater necessity determination unit 406 determines whether to add the repeater for each wireless device 200 based on the communication quality information between the wireless devices and between the wireless devices and the gateway managed by the network configuration management unit 405 of the network management device. In Step S602, the repeater necessity determination unit 406 extracts the wireless devices 200 required to secure a communication connection by addition of the repeater and stabilize the communication quality, such as the wireless devices 200 which cannot achieve the communication requirement in the network configuration at that time. The details of the repeater necessity determination process in Step S602 will be described later with reference to FIG. 9. When the process in Step S602 is completed, the process proceeds to Step S603.

In Step S603, the repeater necessity determination unit 406 determines whether or not there is the wireless device 200 determined to be required to add the repeater, based on the determination result in Step S602. If there is the wireless device determined to require the repeater addition (YES), the process advances to Step S604. On the other hand, when there is no wireless device (NO), since all of the wireless devices 200 are in a state capable of achieving a predetermined communication requirement, and the repeater addition is not required, the flowchart of FIG. 6 is completed.

In Step S604, the access point determination unit 407 of the network management device 400 determines the wireless device 200 or the gateway 300 to be an appropriate access point for each wireless device 200 determined to require the repeater in Step S602. In Step S604, the access point determination unit 407 determines which access point should be selected in order to connect the wireless device 200 requiring the repeater addition to the gateway 300 or another wireless device 200. Details of the access point determination process will be described later with reference to FIG. 10. When the processing of Step S604 is completed, the process proceeds to Step S605.

In Step S605, the repeater placement determination unit 408 of the network management device 400 determines the installation location of the repeater required to connect the wireless device 200 determined to require the repeater in Step 3602 to the access point determined in Step S604. With the execution of the repeater placement determination process in Step S605, the recommended repeater installation location can be calculated even in the environment having no repeater installation location candidates in advance. The details of the repeater placement determination process in Step S605 will be described later with reference to FIG. 11. When the process in Step S605 is completed, the process proceeds to Step S606.

Step S606 is a process of outputting the determination result obtained by the repeater placement determination unit 408 in Step S605 through the display unit 412 of the network management device 400. An operator who performs engineering of the wireless network can easily determine where to additionally install the wireless device 200 as the repeater with reference to the output result. When the process of Step S606 is completed, the process proceeds to Step S607.

In Step S607, the worker installs the wireless device to be the repeater at an actual site based on the determination result of the repeater placement displayed in Step S606. In the case where there is a restriction on the installation location such that the wireless device is driven by a power supply, the wireless device to be the repeater is installed in an installable location closest from the displayed repeater installation location. When the installation is completed, the process returns to Step S601 again and the neighbor terminal management table information is collected. The processing in FIG. 6 is repeated until the wireless device 200 determined to require the addition of the repeater does not exist (until the determination of NO is obtained in Step S603), thereby being capable of calculating the repeater placement required for all of the wireless devices 200 to achieve the predetermined communication requirement.

Figure 7:
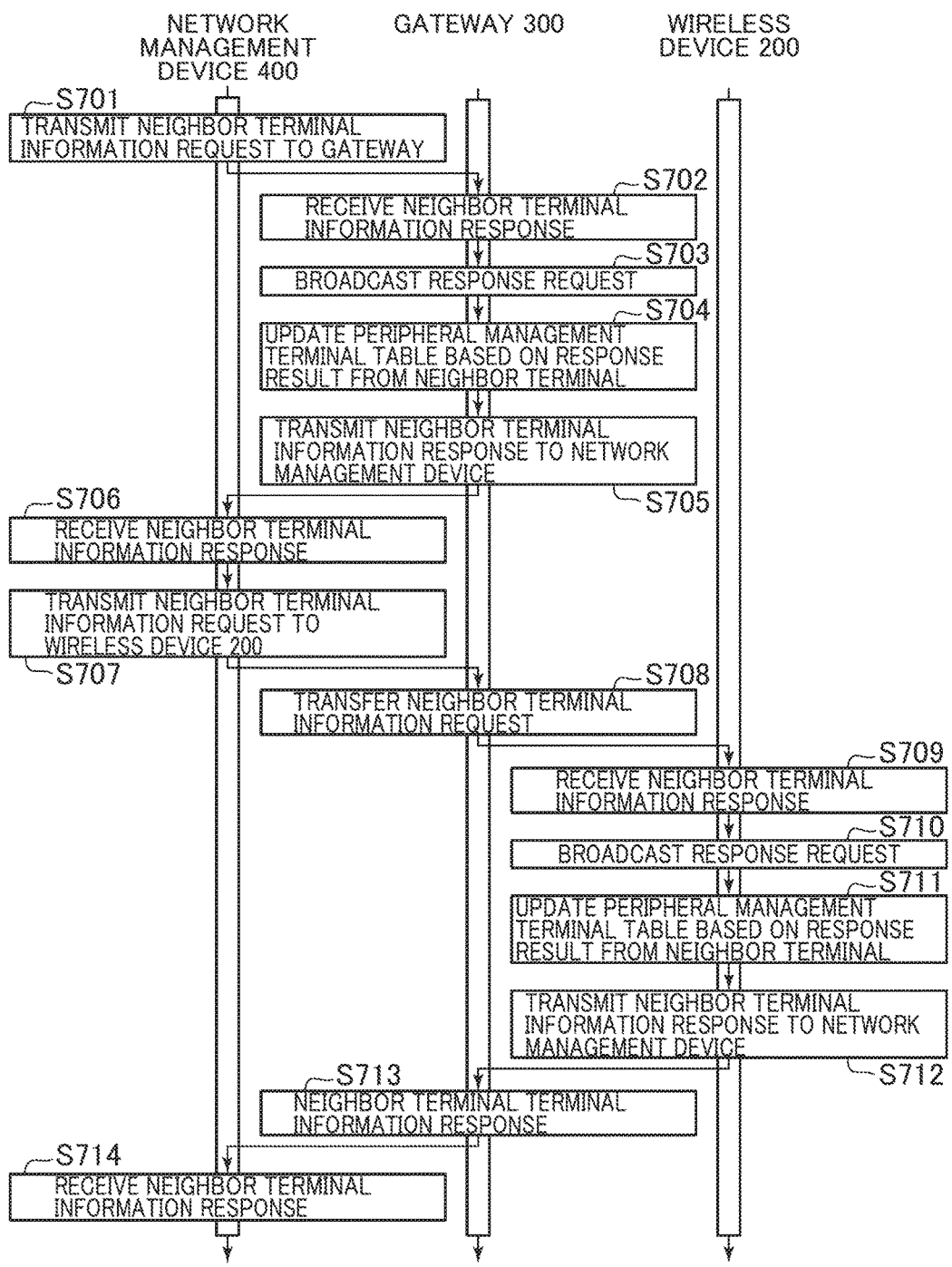
FIG. 7 is a sequence diagram showing a process of collecting the neighbor terminal management table information according to the first embodiment.

An example of the process of collecting the neighbor terminal management table information performed in Step S601 of FIG. 6 will be described with reference to FIG. 7. FIG. 7 is a sequence diagram illustrating the process of collecting the neighbor terminal management table information according to the first embodiment. When the network management device 400 collects the neighbor terminal management table information held by the gateway 300 and the wireless device 200 as the network configuration information, for example, there is a method of performing the process of FIG. 7.

Step S701 is a process in which the network management device 400 transmits a neighbor terminal information request packet to the gateway 300. The neighbor terminal information request packet is a packet for requesting a designated terminal to give notice of information on the neighbor terminal management table held by the terminal.

In Step S702, the gateway 300 receives the neighbor terminal information request packet, and the communication processing unit 302 of the gateway 300 refers to a final destination of the packet, and confirms that the notification of the neighbor terminal management table information is requested to its own. At this time, the communication processing unit 302 of the gateway 300 notifies the neighbor terminal information management unit 304 that the neighbor terminal information is requested.

In Step S703, the gateway 300 broadcasts a response request packet in response to a notification that the neighbor terminal information management unit 304 is requested the neighbor terminal information. The response request packet is a packet for requesting the neighbor terminal that has received the packet to return a response packet.

In Step S704, the response packet is received from the receiving terminal of the response request packet, that is, a neighbor terminal directly communicable by one hop, and the communication processing unit 302 analyzes the packet, and notifies the neighbor terminal information management unit 304 that the response has been received. Thereafter, upon confirming the reception of the response packet, the neighbor terminal information management unit 304 updates the neighbor terminal management table 305, and records a transmission source in the measurement destination 502, a reception time of the response packet in the record time 503, and a communication quality information such as the RSSI at the time of receiving the response packet in the communication quality 504. Incidentally, the processing related to the transmission and reception of the response request packet and the response packet may be performed multiple times. The number of performing the processing may be arbitrarily set, and if the number of times is increased, the neighbor terminals can be detected with high accuracy.

In Step S705, the gateway 300 transmits the neighbor terminal information response packet that stores the updated neighbor terminal management table information to the network management device.

In Step S706, the network management device 400 receives the neighbor terminal information response packet by the gateway 300, and records the neighbor terminal management table information of the gateway 300 as the network configuration information in the network configuration management unit 405.

In Step S707, the network management device 400 transmits the neighbor terminal information request packet to the wireless device 200 under the control of the gateway 200. When the wireless device 200 and the gateway 300 hold the communication route information by the route management units 203 and 303 under an autonomous communication route control or the like, the network management device 400 has only to designate a final destination of the neighbor terminal information request packet. However, when the wireless device 200 and the gateway 300 hold no communication route information, for example, when the route management unit 403 of the network management device 400 performs a centralized control of the communication route, the network management device 400 also stores information on a relay route in the neighbor terminal information request packet, and transmits the neighbor terminal information request packet by source routing based on the stored information on the relay route.

In Step S708, the gateway 300 receives the neighbor terminal information request packet, and the communication processing unit 302 of the gateway 300 refers to the final destination of the packet and transfers the packet to an appropriate transfer destination. When the gateway 300 holds the route information up to a predetermined wireless device 200 in the route management unit 303, the gateway 300 transfers the packet according to the route information. On the other hand, when the gateway 300 holds no route information, the gateway 300 transfers the packet according to the information designated by the source routing.

In Step S709, the wireless device 200 designated by the network management device 400 in Step S707 receives the neighbor terminal information request packet, and the communication processing unit 202 of the wireless device 200 refers to the final destination of the packet and confirms that the notification of the neighbor terminal management table information is requested to the wireless device 200. At that time, the communication processing unit 202 of the wireless device 200 notifies the neighbor terminal information management unit 204 that the neighbor terminal information is requested.

In Step S710, the neighbor terminal information management unit 204 receives notification that neighbor terminal information is being requested, and broadcasts a response request packet.

Step S711 is a process of receiving the response packet from the terminal which receives the response request packet, analyzing the packet by the communication processing unit 202, and notifying the neighbor terminal information management unit 204 that the response has been received. Thereafter, upon confirming the reception of the response packet, the neighbor terminal information management unit 204 updates the neighbor terminal management table 205 in the same manner as in Step S704.

Step S712 is a process in which the wireless device 200 transmits the neighbor terminal information response packet storing the updated neighbor terminal management table information to the network management device 200. If it is determined in Step S707 that the neighbor terminal information request packet is transmitted by source routing, an inversion order of the relay route stored in the packet is stored as information on the relay route in the neighbor terminal information response packet, thereby being capable of transmitting the neighbor terminal information response packet to the network management device by the source routing.

In Step S713, the gateway 300 receives the neighbor terminal information response packet, and the communication processing unit 302 of the gateway 300 refers to the final destination of the packet and transfers the packet to the network management device 400.

In Step S714, the network management device 400 receives the neighbor terminal information response packet by the wireless device 200, and records the neighbor terminal management table information of the wireless device 200 as the network configuration information in the network configuration management unit 405. Thereafter, similarly, the process of transmitting the neighbor terminal information request packet in Step S707 is performed on each wireless device 200 existing under the gateway, and the neighbor terminal management table information is collected from each wireless device 200 and recorded in the network configuration management unit 405, thereby being capable of managing the overall configuration of the network. It is to be noted that if the network management device 400 has not received a response even after a certain period of time after the network management device 400 has transmitted the neighbor terminal information request packet, a retransmission process may be performed as appropriate. When the wireless device 200 whose response has not been obtained even after a certain number of retransmission processes have been performed can be inferred to be in an isolated state in which the wireless device 200 does not enter the network.

In FIG. 7, the network management device 400 gives a command to the gateway 300 and the wireless device 200 as appropriate to collect the neighbor terminal management table information. However, the gateway 300 and the wireless device 200 may autonomously transmit the neighbor terminal management table information to the network management device in a constant cycle. For example, in the case of the wireless device conforming to the wireless standard WirelessHART (registered trademark), the wireless device can periodically give notice of information corresponding to the neighbor terminal management table as Heath Report. In this processing, the process of collecting the neighbor terminal management table information in Step S601 of FIG. 6 may be realized.

Figure 8:
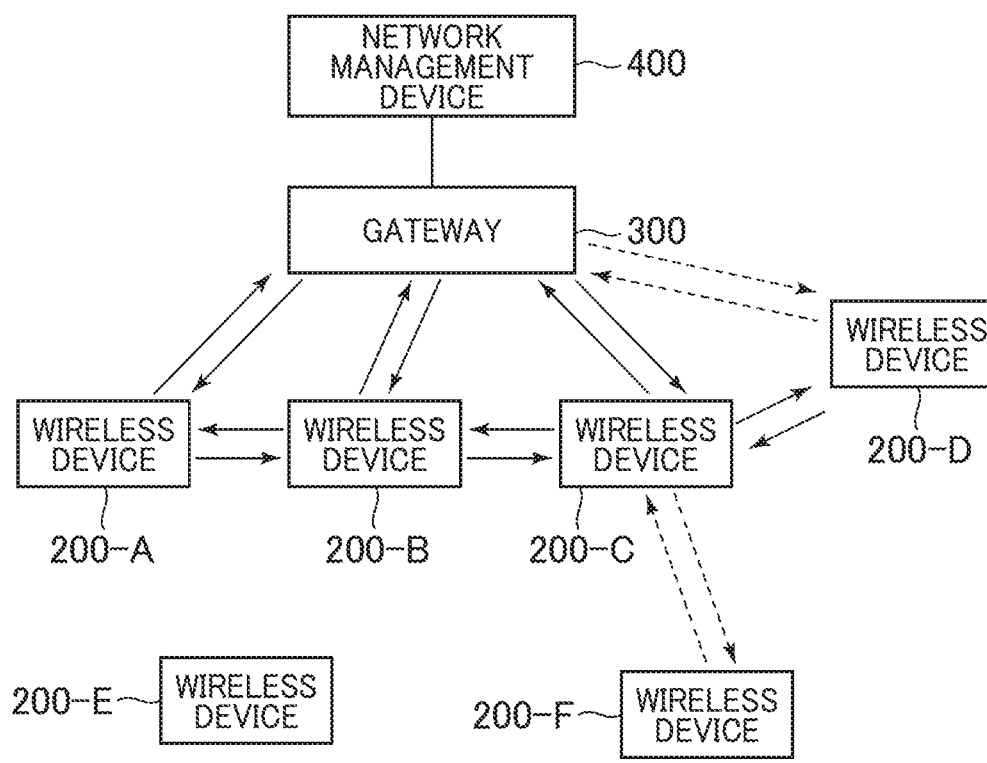
FIG. 8 is an illustrative diagram showing a network configuration example based on a collection result of the neighbor terminal management table information according to the first embodiment.

FIG. 8 shows an example of the network configuration managed by the collection result of the neighbor terminal management table information. FIG. 8 is an illustrative diagram showing a network configuration example based on the collection result of the neighbor terminal management table information according to the first embodiment. For example, when, in Step S601 of FIG. 6, the network management device 400 collects information (neighbor terminal management table information) on the neighbor terminal management table 205 illustrated in FIG. 5 from the wireless device 200-A of FIG. 1, it can be grasped that the wireless device 200-A can directly communicate with the gateway 300 and the wireless device 200-B by one hop and can communicate with the communication quality of −65 dBm and −70 dBm, respectively. The neighbor terminal management table information on the gateway 300 and the wireless device 200 is collected and managed by the network configuration management unit 405 of the network management device 400, thereby being capable of grasping a connectivity (for example, the communication quality is equal to or more than a threshold value) between all the wireless devices and between the gateway and the wireless devices shown in FIG. 8 as the configuration information of the wireless network. In the repeater necessity determination process and the access point determination process, which will be described later in FIGS. 9 and 10, the determination is performed based on the configuration information as shown in FIG. 8.

FIG. 8 exemplifies the communication quality of the link by solid lines (equal to or more than a threshold value) and dotted lines (less than the threshold value) depending on whether the communication quality is equal to or more than the threshold value. The threshold value of the communication quality is set as a standard indicative of whether or not the requirement necessary for the communication system can be achieved. Aside from the threshold value using the RSSI as an index, when emphasizing other indices such as a packet loss rate in applications running in the communication system, in order to determine whether or not the communication requirement can be achieved, the threshold value incorporating those indices may be appropriately set.

Moreover, in addition to statically predefining the threshold value in a program, the threshold value may be held as a variable parameter, and the operator may dynamically appropriately defined the threshold value on a screen for displaying the communication quality information and the determination result of the repeater placement to be described later, and the like.

Figure 9:
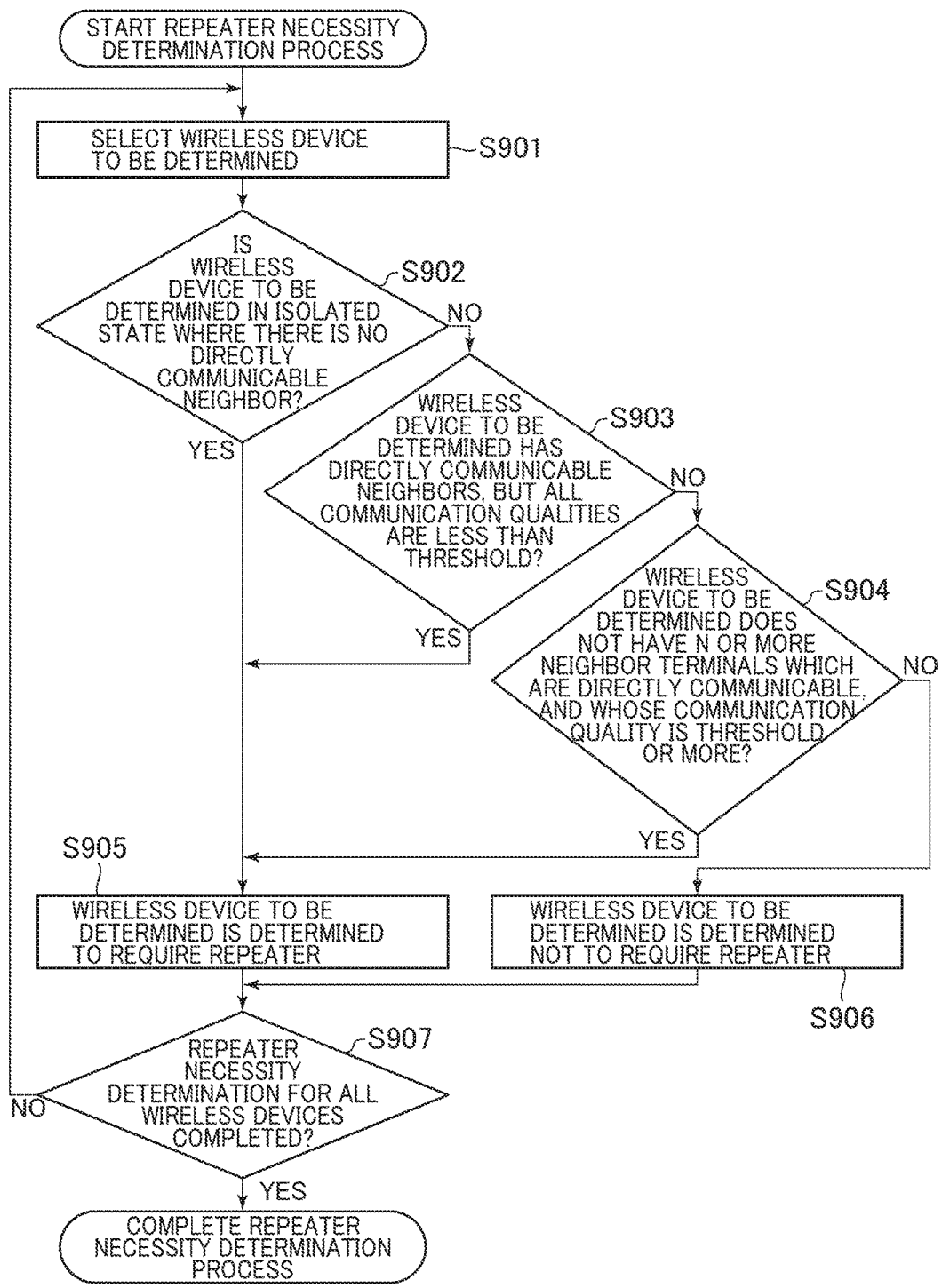
FIG. 9 is a flowchart showing a repeater necessity determination process according to the first embodiment.

Referring to FIG. 9, the repeater necessity determination process performed by the repeater necessity determination unit 406 of the network management device 400 performed in Step S602 of FIG. 6 will be described. FIG. 9 is a flowchart showing the repeater necessity determination process according to the first embodiment. With the execution of the processing in FIG. 9, the necessity of the repeater addition for each wireless device 200 can be determined on the basis of the information managed by the network configuration management unit 405 of the network management device 400.

Step S901 is a process of selecting one wireless device to be determined for the necessity of the repeater from all the wireless devices 200. Upon completion of the process of Step S901, the process proceeds to Step S902.

In Step S902, it is determined whether or not the determination target wireless device 200 is in an isolated state in which there is no neighbor (communication target) directly communicable by one hop around the wireless device 200. For example, in an example of FIG. 8, the wireless device 200-E corresponds to the isolated state. When the determination target wireless device 200 is in the isolated state (YES), the process proceeds to Step S905, and if the wireless device 200 to be determination is not in the isolated state (NO), the process proceeds to Step S903.

Step S903 is a process to determine whether or not all the communication qualities of the neighbors directly communicable with the determination target wireless device 200 by one hop are less than the threshold value. For example, in the example of FIG. 8, the wireless device 200-F can communicate directly with the wireless device 200-C, but since the communication quality is less than the threshold value, the predetermined communication requirement cannot be satisfied, which conforms to the determination condition. If there is no communicable neighbor whose communication quality is equal to or more than the threshold value for the determination target wireless device 200 (YES), the process proceeds to Step S905, and if there is a communicable neighbor having the threshold value or more (NO), the process proceeds to Step S904.

Step S904 is a process for determining whether there are N or more wireless devices 200 capable of directly communicating with the determination target wireless device 200 by one hop and having a communication quality equal to or higher than the threshold value. As a feature of the wireless multi-hop network, there is an advantage that a failure recovery can be performed by switching to another communication route when a local disconnection occurs. In order to achieve the above process, a redundancy enabling the route switching is required for the communication connection of each wireless device 200. In the case of N=1, the present or absence of redundancy of the communication connection is not taken into consideration in the repeater necessity determination, and in the case where N is set to a value of 2 or more, the presence or absence of redundancy is also considered in the repeater necessity determination. As a value of N is larger, the redundancy is higher, the redundancy is higher, thereby being capable of building the communication system excellent in fault tolerance. However, since the number of repeaters as required is increased, the costs also increase. N is any value from 1 or more and may be set in consideration of those tradeoffs appropriately.

For example, the communication partner directly communicatable with the wireless device 200-D in FIG. 8 and whose communication quality is equal to or higher than the threshold value is only the wireless device 200-C. When the communication connection with the wireless device 200-C is disconnected, a route for obtaining the communication quality equal to or more than the threshold value cannot be ensured. There is only one communication partner directly communicable with the wireless device 200-D and having the communication quality equal to or more than the threshold value, and in the case of N=2, the wireless device conforms to the condition in Step S904. When there are not N or more communicable neighbor whose communication quality equal to or more than the threshold value for the determination target wireless device 200 (YES), the process proceeds to Step S905, and when there are N or more communicable neighbors (NO), the process proceeds to Step S906.

In Step S905, it is determined that the wireless device 200 that satisfies the determination conditions in any of Steps S902 to S904 is the wireless device 200 requiring the addition of the repeater. In other words, (1) the wireless device 200 that is in the isolated state in which there is no neighbor terminal directly communicable by one hop, (2) the wireless device 200 having no neighbor terminal directly communicable by one hop and whose communication quality is equal to or more than the threshold value, and (3) the wireless device 200 having neighbor terminals directly communicable by one hop and whose communication quality is equal to or more than the threshold value, but whose number is less than N, are determined as the wireless devices 200 requiring the repeater addition. Upon completion of the processing in Step S905, the process proceeds to Step S907.

In Step S906, it is determined that the wireless device 200 that does not meet any of the determination conditions in Steps S902 to S904 is determined to be the wireless device 200 that does not require the addition of the repeater. Since the wireless device 200 can achieve a predetermined communication requirement without the addition of the repeater, the repeater can be determined to be unnecessary. Upon completion of the processing in Step S906, the process proceeds to Step S907.

Step S907 is a process of determining whether or not the repeater necessity determination for all of the wireless devices 200 has been completed. If the repeater necessity determination for all of the wireless devices 200 has been completed (YES), a flowchart of FIG. 9 is completed. When the wireless devices 200 which have not yet been determined (NO), the process returns to Step S901, and the wireless devices 200 which have not yet been determined are selected as the determination targets, and the repeater necessity determination process is repeated.

Figure 10:
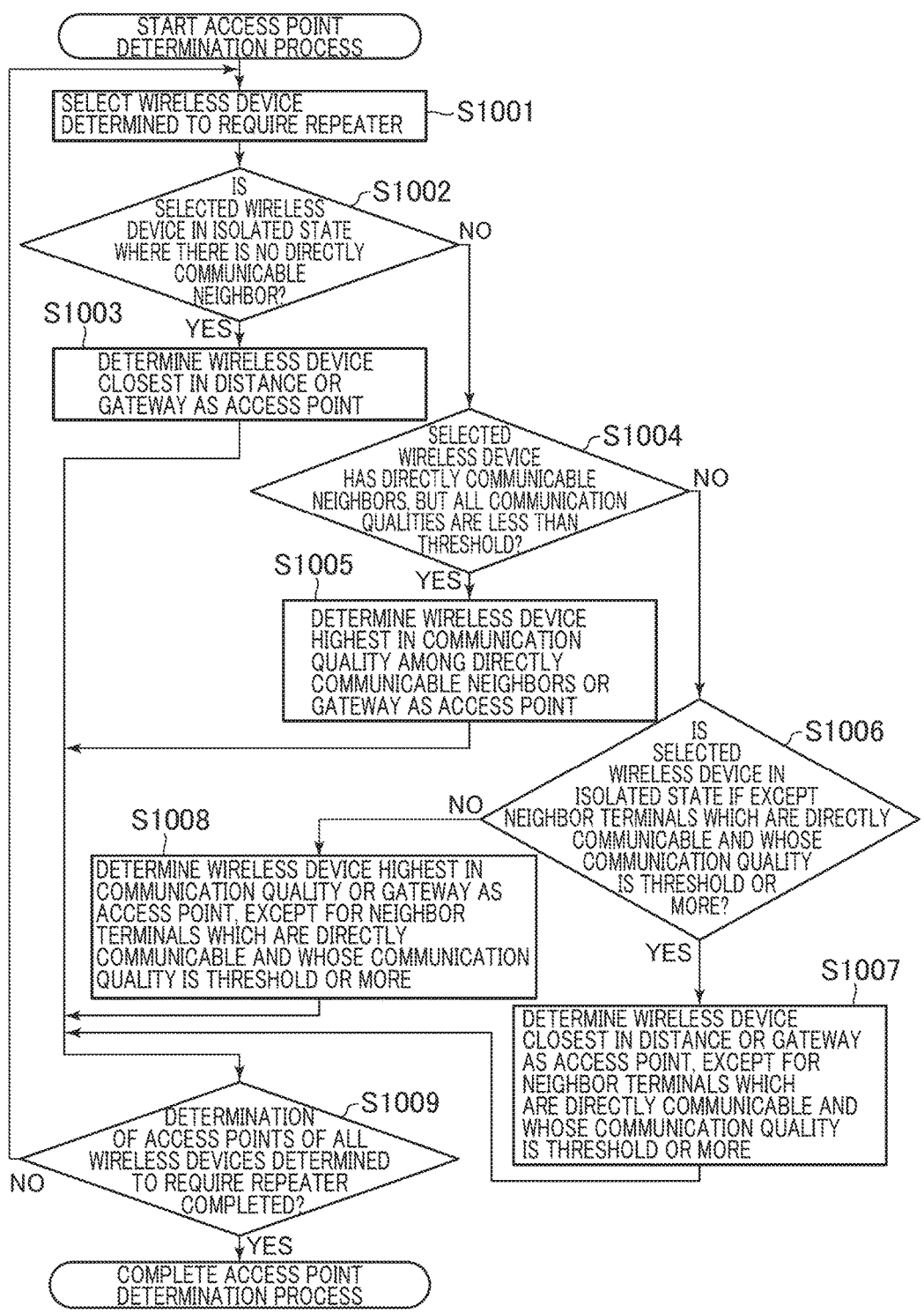
FIG. 10 is a flowchart showing an access point determination process according to the first embodiment.

The access point determination process by the access point determination unit 407 of the network management device, which is performed in Step S604 of FIG. 6 will be described with reference to FIG. 10. FIG. 10 is a flowchart showing the access point determination process according to the first embodiment. With the execution of the processing in FIG. 10, it can be determined which of the wireless devices 200 or the gateway 300 should be connected to the wireless device 200 determined to require the repeater addition in the repeater necessity determination process in FIG. 9, based on the management information of the network configuration management unit 405.

Step S1001 is a process of selecting one wireless device 200 to be subjected to the access point determination process from the wireless devices 200 determined to require the repeater addition in the repeater necessity determination process of FIG. 9. Upon completion of the processing in Step S1001, the process proceeds to Step S1002.

In Step S1002, it is determined whether or not the determination target wireless device 200 is in an isolated state in which there is no neighbor directly communicatable by one hop. If the determination target wireless device 200 is in the isolated state (YES), the process proceeds to Step S1003. If the determination target wireless device 200 is not in the isolated state (NO), the process proceeds to Step S1004.

Step S1003 is a process of determining the wireless device 200 or the gateway 300 having the shortest distance from the wireless device 200 which is in the isolated state as an appropriate access point. Since radio waves have a characteristic of attenuating with the distance, the wireless device 200 or the gateway 300 having the shortest distance, that is, the smallest expectation of attenuation of the radio waves is selected as the access point. For example, in the example of FIG. 8, for the wireless device 200-E in the isolated state, the wireless device 200-B having the shortest distance from the wireless device 200-E which is in the isolated state is selected as the access point. Incidentally, as the positional information of the wireless device 200 and the gateway 300 used in this determination process, in the case where actual latitude and longitude information and so on are given such as when the wireless device 200 or the gateway 300 is equipped with a GPS (Global Positioning System) or such as when positional information on the installation location is given in advance, those pieces of information is leveraged. On the other hand, when the positional information on the wireless device 200 and the gateway 300 is not obtained, the operator sets positions of the wireless device 200 and the gateway 300 on a screen to be described later with reference to FIG. 13 by mouse operation, and performs the access point determination process with the use of the positional information on the screen. When the processing in Step S1003 is completed, the process proceeds to Step S1009.

In Step S1004, it is determined whether or not all of the communication qualities with the neighbors are less than a threshold value, while there are the neighbors directly communicable with the determination target wireless device 200 by one hop. If there is no communicable neighbor whose communication quality is equal to or more than the threshold value for the determination target wireless device 200 (YES), the process proceeds to Step S1005. If there is the communicable neighbor whose communication quality is equal to or more than the threshold value (NO), the processing proceeds to Step S1006.

Step S1005 is a process of determining the wireless device 200 or the gateway 300 having the highest communication quality among the neighbor terminals directly communicable with the wireless device 200 having no neighbor terminal whose communication quality is equal to or more than the threshold value as an appropriate access point. This is because even if the communicable neighbor whose communication quality is less than the threshold value has a communication connection, there is a high possibility that the communication quality is improved and stabilized by the addition of the repeater. For example, in the example of FIG. 8, although the communication quality of the wireless device 200-F is less than the threshold value, since the communication connection with the wireless device 200-C is obtained, the wireless device 200-C is selected to an appropriate access point. When the process in Step S1005 is completed, the process proceeds to Step S1009.

Step S1006 is a process of determining whether or not the determination target wireless device 200 is in an isolated state, or not, when excluding the neighbor terminals that can communicate directly and whose communication quality is equal to or more than the threshold value from the determination target wireless device 200. When the determination target wireless device 200 becomes in the isolated state with the above exclusion (YES), the process advances to Step S1007, and when the determination target wireless device 200 does not become in the isolated state (NO), the process advances to Step S1008. For example, in the example of FIG. 8, when N=2 is met, the wireless device 200-D is determined that the repeater addition is necessary in the repeater necessity determination process of FIG. 9, and the determination is made in Step S1006. However, if the wireless device 200-C whose communication quality is equal to or more than the threshold value is excluded from the wireless device 200-D, since the gateway 300 whose communication quality is less than the threshold value remains as the communicable neighbor, the determination on the wireless device 200-D follows Step S1008.

Step S1007 is a process in which, with the exclusion of the neighbor terminals which are directly communicable with the determination target wireless device 200 and whose communication quality is equal to or more than the threshold value, the wireless device 200 or the gateway 300 having the shortest distance is determined as an appropriate access point. This is because, in order to secure the redundancy of the communication connection, the wireless device 200 or the gateway 300 having the smallest expectation of radio wave attenuation is selected as the access point in the same way as described above. Upon completion of the processing in Step S1007, the process advances to Step S1009.

Step S1008 is a process in which, with the exclusion of the partner terminals which are directly communicable with the determination target wireless device 200 and whose communication quality is equal to or more than the threshold value, the wireless device 200 or the gateway 300 having the highest communication quality is determined as an appropriate access point. This is because, in order to secure the redundancy of the communication connection, the wireless device 200 or the gateway 300 having the highest possibility of improving and stabilizing the communication quality by addition of the repeater is selected as the access point in the same way as described above. In the example of FIG. 8, the gateway 300 is selected as the access point of the wireless device 200-D in accordance with the determination process. Upon the completion of Step S1008, the process proceeds to Step S1009.

Step S1009 is a process of determining whether or not the access point determination has been completed with respect to all of the wireless devices 200 determined to require the addition of the repeater 200. When the determination on all of the wireless devices 200 has been completed (YES), the flowchart of FIG. 10 is completed. If there is any wireless device 200 left undetermined (NO), the process returns to Step S1001, the wireless devices 200 that have not been determined are selected as the determination targets, and the access point determination process is repeated.

Figure 11:
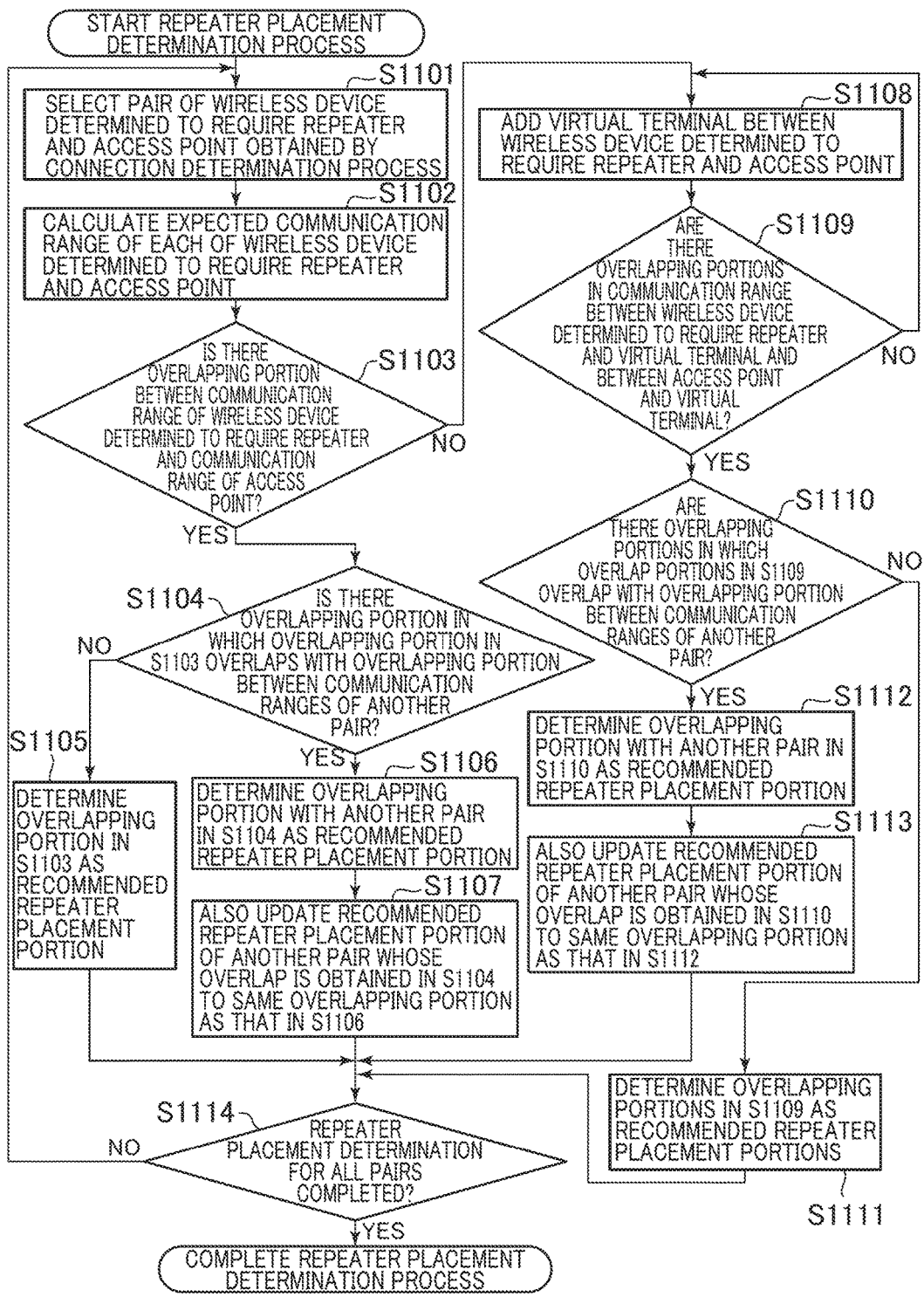
FIG. 11 is a flowchart showing a repeater placement determination process according to the first embodiment.
Figure 12:
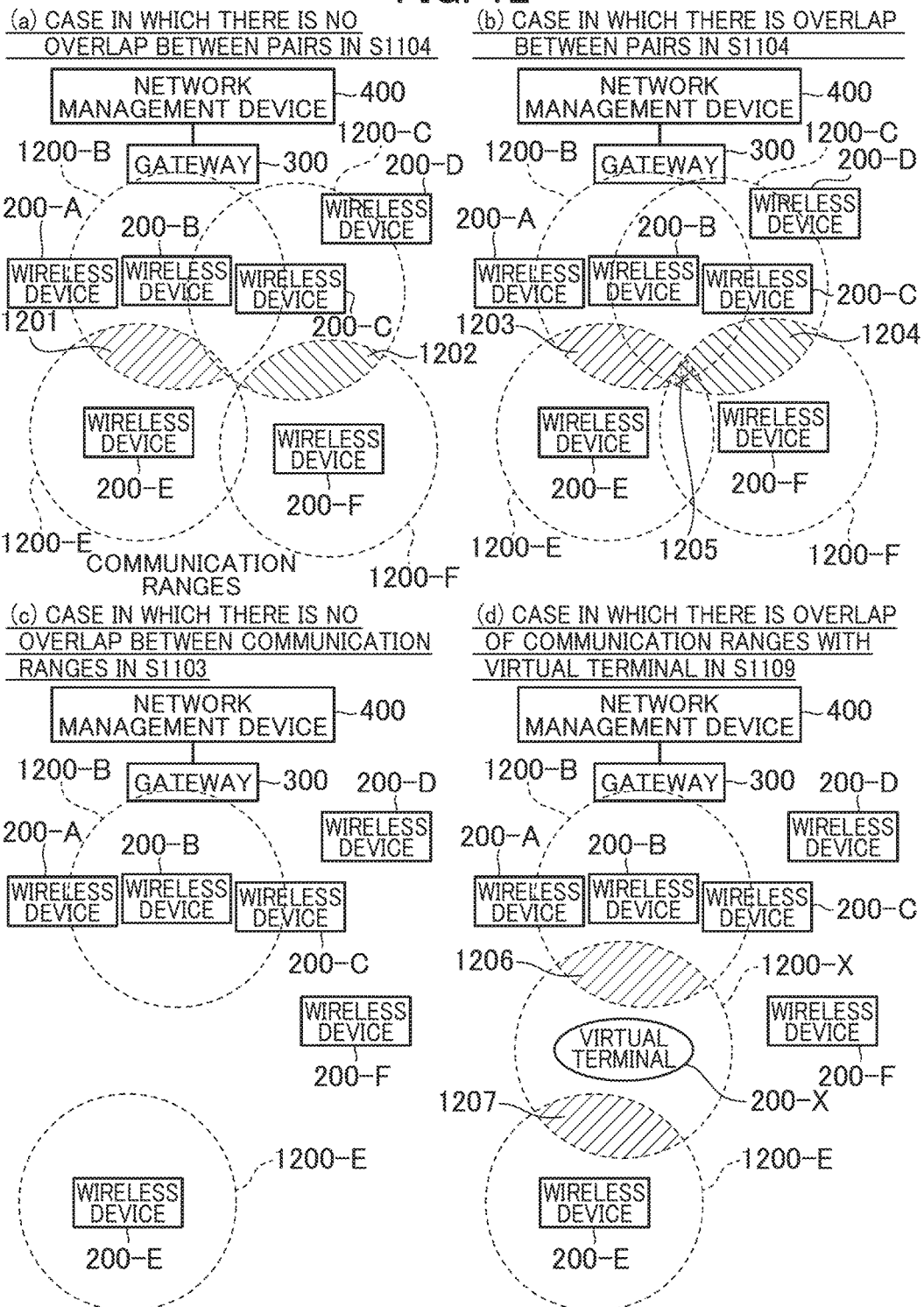
FIGS. 12A to 12D are illustrative diagrams of determination examples related to a repeater placement determination process according to the first embodiment.

The repeater placement determination process by the repeater placement determination unit 408 of the network management device 400, which is performed in Step S605 of FIG. 6, will be described with reference to FIG. 11. FIG. 11 is a flowchart showing a repeater placement determination process according to the first embodiment. With the execution of the processing in FIG. 11, the installation location of the repeater required for connecting the wireless device 200 determined to require the repeater addition in the repeater necessity determination process in FIG. 9 to the access point selected in the access point determination process of FIG. 10 can be determined.

Step S1101 is a process of selecting one pair to be subjected to the determination from pairs of the wireless devices 200 determined to require the repeater addition in the repeater necessity determination process of FIG. 9 and the access points selected in the access point determination process of FIG. 10. Upon the completion of the processing in Step S1101, the process proceeds to Step S1102.

Step S1102 is a process of calculating a communication range expected for each of the wireless device 200 determined to require the addition of the repeater and the selected access point in the pair to be determined. For the communication range to be used in the processing, there is, for example, a method of applying a communication range theoretically obtaining a communication quality equal to or more than a threshold value based on a theoretical expression relating to radio wave propagation. In addition, there is also a method of applying a communication range with the longest distance among the distances between the wireless devices or between the gateway and the wireless devices where the communication quality equal to or higher than the threshold value is secured based on the network configuration information shown in FIG. 8. The setting of the communication range applied in the determination process is not limited to a specific setting method, but may be performed by an arbitrary method. Upon the completion of the processing in Step S1102, the process proceeds to Step S1103.

In Step S1103, it is determined whether or not there is an overlapping portion between the communication ranges of the wireless device 200 determined to require the repeater addition and the selected access point in the pair to be determined. FIG. 12A shows an example in which there are overlapping portions of the communication ranges in the pair of the wireless device 200-E and the wireless device 200-B, and the pair of the wireless device 200-F and the wireless device 200-C. In FIG. 12A, dotted lines on concentric circles centering around the wireless devices indicate the communication ranges of the respective wireless devices, for example, a communication range 1200-B of the wireless device 200-B, a communication range 1200-C of the wireless device 200-C, a communication range 1200-E of the wireless device 200-E, and a communication range 1200-F of the wireless device 200-F. In addition, an area in which the communication range 1200-B and the communication range 1200-E overlap with each other indicates an overlapping portion 1201, and an area in which the communication range 1200-C and the communication range 1200-F overlap with each other indicates an overlapping portion 1202. As shown in FIG. 12A, when there are the overlapping portions in the communication ranges calculated in Step S1102 (YES), the process proceeds to Step S1104, and when there is no overlapping portion (NO), the process proceeds to Step S1108.

In Step S1104, it is determined whether or not there is an overlapping portion in which both of the overlapping portion of the pair to be determined in Step 1103 and the overlapping portion of the communication range of another pair overlap with each other. In this case, FIG. 12B shows an example in which there is a further overlapping portion of the communication ranges between the pair of the wireless device 200-E and the wireless device 200-B, and the pair of the wireless device 200-F and the wireless device 200-C. For example, an area in which the communication range 1200-B and the communication range 1200-E overlap with each other indicates an overlapping portion 1203, an area in which the communication range 1200-C and the communication range 1200-F overlap with each other indicates an overlapping portion 1204, and an area in which the overlapping portion 1203 and the overlapping portion 1204 partially further overlap with each other indicates an overlapping portion 1205. In the case where a distance between the pairs is short, there is a case in which a further overlapping portion 1205 of the communication ranges occurs between the plural pairs. As shown in FIG. 12B, when there is the further overlapping portion of the communication ranges between the determination target pair and another pair (YES), the process proceeds to Step S1106, and when there is not the further overlapping portion (NO), the process proceeds to Step S1105.

Step S1105 is a process to select the overlapping portion detected in Step S1103 as the installation location of the repeater recommended for connecting the determination target pair. The overlapping portions 1201 and 1202 in FIG. 12A are appropriate portions, and overlap with both the communication ranges of the wireless device 200 determined to require the repeater addition and the selected access point. Therefore, when the repeaters are installed in the overlapping portions 1201 and 1202, it is expected that the repeater can obtain a communication connection with both terminals in the determination target pair. When the processing in Step S1105 is completed, the process proceeds to Step S1114.

Step S1106 is a process of selecting an overlapping portion with another pair detected in Step S1104 as an installation location of the repeater recommended for connecting the determination target pair. In FIG. 12A, there is a need to add two repeaters for two pairs of the wireless device 200-E and wireless device 200-B, and the wireless device 200-F and the wireless device 200-C. However, in the example of FIG. 12B, both of the pairs can be connected to each other with one repeater, and the overlapping portion between the two pairs is an appropriate portion. In this way, when there is the overlapping portion 1205 of the communication ranges between the plural pairs, the number of repeaters as required can be reduced by selecting the overlapping portion 1205 as the installation location of the repeater. When the processing in Step S1106 is completed, the process proceeds to Step S1107.

Step S1107 is a process of updating the recommended installation location of the repeater to the same overlapping portion as that of Step S1106 for another pair with which overlapping is obtained in Step S1104. Upon completion of the processing in Step S1107, the process proceeds to Step S1114.

Step S1108 is a process of adding a virtual terminal between the wireless device 200 determined to require the repeater and the selected access point when there is no overlapping portion between the communication ranges in the determination target pair. FIG. 12C shows an example in which there is no overlapping portion between the communication ranges in the determination target pair. In FIG. 12C, the pair of the wireless device 200-E and the wireless device 200-B are distant from each other, and when there is no overlapping area between the communication range 1200-E of the wireless device 200-E and the communication range 1200-B of the wireless device 200-B, the pair cannot be connected by the addition of one repeater. Therefore, in the processing in Step S1108, for example, as shown in FIG. 12D, a virtual terminal (virtual terminal) 200-X is added between the wireless device 200-E determined to require the repeater and the selected access point (200-B) to try the generation of an overlapping portion of the communication ranges. Upon the completion of the processing in Step S1108, the process proceeds to Step S1109.

Step S1109 is a process of determining whether or not there is the overlapping portion between the communication ranges in both of the wireless device 200-B determined to require the addition of the repeater and the virtual terminal 200-X, and the selected access point (200-B) and the virtual terminal 200-X in the determination target pair. When there are an overlapping portion 1206 which is an area in which the communication range 1200-B of the wireless device 200-B and a communication range 1200-X of the virtual terminal 200-X overlap with each other, and an overlapping portion 1207 which is an area in which the communication range 1200-E of the wireless device 200-E and the communication range 1200-X of the virtual terminal 200-X overlap with each other (YES), the process proceeds to Step S1110. On the other hand, when there is no overlapping portion in either one (NO), the process returns to Step S1108 to add the virtual terminal. In the example of FIG. 12D, the virtual terminal 200-X is installed at a midpoint of the pair when one virtual terminal is added, but if two virtual terminals are added, for example, division points obtained by trisecting a distance between the pair are selected for the installation locations of the virtual terminals.

In Step S1110, it is determined whether or not there is an overlapping portion in which both of the overlapping portion of Step S1109 and the overlapping portion of the communication ranges of another pair overlap with each other. When there is the overlapping portion of the communication ranges with another pair (YES), the process proceeds to Step S1112, and when there is no overlapping portion (NO), the process proceeds to Step S1111.

Step S1111 is a process to select the overlapping portion detected in Step S1109 as the installation location of the repeater recommended for connecting the detection target pair. The overlapping portions 1206 and 1207 in FIG. 12D are appropriate portions, and since the wireless device 200-E determined to require the repeater addition and the selected access point (200-B) are distant from each other, the installation locations for the multiple repeaters are selected. When the addition of the repeater is also required at a location where the virtual terminal 200-X is placed in the connection of the determination target pair, the above location may be selected as the recommended installation location of the repeater in addition to the overlapping portion of the communication ranges. Upon the completion of the processing in Step S1111, the process proceeds to Step S1114.

Step S1112 is a process of selecting an overlapping portion with another pair detected in Step S1110 as an installation location of the repeater recommended for connecting the determination target pair. This is intended to reducing the number of required repeaters as in Step S1106. Upon the completion of the processing in Step S1112, the process proceeds to Step S1113.

Step S1113 is a process of updating the recommended installation location of the repeater to the same overlapping portion as that of Step S1112 for another pair with which the overlapping is obtained in Step S1110. When the processing in Step S1113 is completed, the process proceeds to Step S1114.

Step S1114 is a process of determining whether or not the repeater placement determination has been completed for all the pairs of the wireless devices 200 determined to require the repeater addition in the repeater necessity determination process of FIG. 9 and the access points selected in the access point determination process of FIG. 10. When the determination for all the pairs has been completed (YES), the flowchart in FIG. 11 is completed, and when there are the undetermined pairs (NO), the process returns to Step S1101, the undetermined pairs are selected as the determination targets, and the repeater placement determination process is repeated.

In Steps S1103, S1104, S1106, and S1107, the repeater placement determination unit 408 determines, as a pair, the wireless device 200 selected by the repeater necessity determination unit 406 and the access point selected by the access point determination unit 407. When there is an area in which the overlapping portion (first overlapping portion) 1203 indicative of an area in which the communication ranges in the pair overlap with each other and the overlapping portion (second overlapping portion) 1204 indicative of an area in which the communication ranges in another pair overlap with each other further overlap with each other, it is determined that there is the repeater installation location. The further overlapping area is output as an overlapping portion (third overlapping portion) 1205 common to both of the pairs, which is the repeater installation location.

In Steps S1103, S1108 to S1110, and S1111, the repeater placement determination unit 408 virtually places one or more virtual terminals 200-X between the wireless device 200 selected by the repeater necessity determination unit 406 and the access point selected by the access point determination unit 407 when there is no overlapping portion indicative of an area in which the communication range of the wireless device 200 selected by the repeater necessity determination unit 406 and the communication range of the access point selected by the access point determination unit 407 overlap with each other. When there are the overlapping area (first virtual overlapping portion) 1206 indicative of an area in which the communication range of the wireless device 200 selected by the repeater necessity determination unit 406 and the communication range of the virtual terminal 200-X overlap with each other and the overlapping area (second virtual overlapping portion) indicative of an area in which the communication range of the access point selected by the access point determination unit 407 and the communication range of the virtual terminal 200-X overlap with each other, the repeater placement determination unit 408 determines that there is the repeater installation location, and outputs the overlapping areas 1206 and 1207 as the repeater installation locations.

A display example of the communication quality information to be displayed through the display unit 412 of the network management device and the recommended repeater placement will be described with reference to FIGS. 13A and 13B. FIGS. 13A and 13B are illustrative diagrams showing display examples of the communication quality information and the repeater placement determination result according to the first embodiment. Referring to FIG. 13A, the display unit 412 has a display screen 1300, and a display area 1301 for displaying map information, the wireless device 200, and so on is set on the display screen 1300. In addition, communication quality information 1302 indicating a display example in the case where the communication quality is divided into three levels (strong, medium, weak), an item 1303 for switching a display presence or absence (on or off) related to the recommended repeater placement, and an item ((1) isolated state, (2) only poor link, (3) no redundancy) 1304 to switch the determination target wireless device 200 are displayed on the display screen 1300.

As shown in FIG. 13A, the communication qualities between the wireless devices and between the wireless devices and the gateway are displayed on the display screen 1300 through the display unit 412 based on the neighbor terminal management table information collected from each wireless device 200 and the gateway 300 managed by the network configuration management unit 405 of the network management device 400, thereby being capable of visually grasping the overall configuration of the network and the communication quality. For example, in the case where the neighbor terminal management table information cannot be collected from the specific wireless device 200, and the information on the wireless devices 200 is not recorded in any of the neighbor terminal management tables 205 and 305 of the other wireless devices 200 and the gateway 300, since the communication quality information cannot be displayed like "E" (wireless device 200-E) in FIG. 13A, it is easy to grasp that the wireless device is in an isolated state where no communication is enabled. In the example of FIG. 13A, the item 1303 is off, and the communication quality is displayed in three levels. The communication quality to be displayed may be set to an arbitrary value such as the latest value, an average value, a maximum value, and a minimum value observed in the past. It is not always necessary to display the communication quality by level classification, and a specific numerical value may be displayed. In addition, a timing at which to update the display contents may be an arbitrary timing such as when the network management device 400 updates the management information of the network configuration management unit 405, when the operator instructs updating, and so on. Also, the placement of the wireless devices and the gateway on the screen may be set by inputting actual positional information or by a mouse operation or the like by the operator.

Subsequently, a display example of the determination result related to the repeater arrangement will be described with reference to FIG. 13B. When the item 1303 is turned on, as shown in FIG. 13B, the communication quality information managed by the network configuration management unit 405 and the repeater installation locations 1310, 1311, and 1312 which are the determination results of the repeater placement determination unit 408 are displayed in the display area 1301 in association with the wireless devices 200-A to 200-F (A to F) and the gateway (GW) 300 belonging to the wireless multi-hop network. In this manner, the wireless devices (D, E, F) determined to require the repeater addition and the determination reason (no redundancy, isolated state, poor link only) are displayed on the display screen 1300 based on the determination result by the repeater necessity determination unit 406 of the network management device 400, so that the operator can visually grasp which wireless device 200 requires the repeater addition. Further, the recommended repeater installation locations 1310, 1311, and 1312 calculated by the repeater placement determination unit 408 are displayed, thereby being capable of easily grasping where the wireless device to be the repeater is specifically added. At that time, as shown in FIG. 13B, a map and a floor map are displayed by layering, thereby being capable of presenting the installation location of the repeater in a more easily understandable manner. In the example of FIG. 13B, the item 1303 is on, and the recommended repeater installation locations 1310, 1311, and 1312 are shown in a circle, but the overlapping portion of the communication ranges determined in the processing of FIG. 11 may be displayed as it is.

In this example, it is assumed that there is no constraint on the repeater installation location. However, for example, even if the repeater is driven by a power supply and installation is limited to a location where power can be supplied, the operator can make a determination such as installing the repeater at the closest location from the displayed recommended installation location among the installable locations. Alternatively, in the case where the installable location of the repeater is known, the closest installable location may be explicitly displayed from the recommended repeater installation locations calculated by the repeater placement determination unit 408. In addition, in the example of FIGS. 13A and 13B, when there are a large number of wireless devices 200 and the display becomes complicate, in order to simplify the screen, the item 1303 for switching the presence and absence of display concerning the recommended repeater placement and the item 1304 for switching the determination target wireless device are shown. However, those functions are not always installed.

As described above, according to the present embodiment, in the wireless multi-hop network, the installation location of the repeater can be calculated based on the information for managing the wireless network without requiring advance information on the installation location candidates of the repeater. More specifically, the wireless device 200 requiring the addition of the repeater and the appropriate access point are determined on the basis of the neighbor terminal management table information collected from each wireless device 200 and the gateway 300, and thereafter, the installation location of the repeater required for connecting the wireless device 200 determined to require the addition of the repeater and the access point is determined and output as the repeater installation location, thereby being capable of determining the placement design of the repeater without requiring the advance information related to the repeater installation location candidates. In addition, since it is not necessary to install the wireless device in all of the potential repeater station installation candidates and measure the connectivity, the engineering work load relating to the repeater placement design can be reduced. Further, since even a worker, who does not have expertise on the wireless communication, can grasp the appropriate installation location of the repeater from output of the repeater placement determination result, the engineering work can be implemented.

Second Embodiment

In a second embodiment, an example in which a determination is made with priority in a repeater necessity determination for a wireless device 200 will be described. More specifically, (1) the wireless device 200 which is in an isolated state where there is no neighbor terminal directly communicable by one hop, and (2) a repeater addition to the wireless device 200 having no neighbor terminal which is directly communicable by one hop and whose communication quality is equal to or more than a threshold value is prioritized, and thereafter (3) the repeater addition is performed for the wireless device 200 having a neighbor terminal which is directly communicable by one hop and whose communication quality is equal to or more than the threshold value but the number of which is less than N.

This is a measure intended for reducing the number of repeaters. Since the wireless device 200 corresponding to the above items (1) and (2) cannot achieve a predetermined communication requirement without adding the repeater, the wireless device 200 is treated as a wireless device 200 having a higher priority of adding the repeater 200. At that time, the repeater is added to the wireless device 200 corresponding to the above items (1) and (2), as a result of which the neighbor terminals which can communicate directly with other wireless devices 200 present around the subject wireless device 200 may be increased. In other words, the wireless device corresponds to the above item (3) in an initial stage, and the neighbor terminals which are directly communicable with the wireless device 200 requiring the addition of the repeater and whose communication quality is equal to or more than the threshold value are increased in a process of adding the repeater to the wireless device 200 corresponding to the above items (1) and (2), and a case not corresponding to the above item (3) may occur. In that case, in the first embodiment, since the repeater may not be added in the second embodiment for the wireless device 200 determined to require the repeater addition from the viewpoint of the redundancy of the communication connection, the number of repeaters can be reduced.

Figure 14:
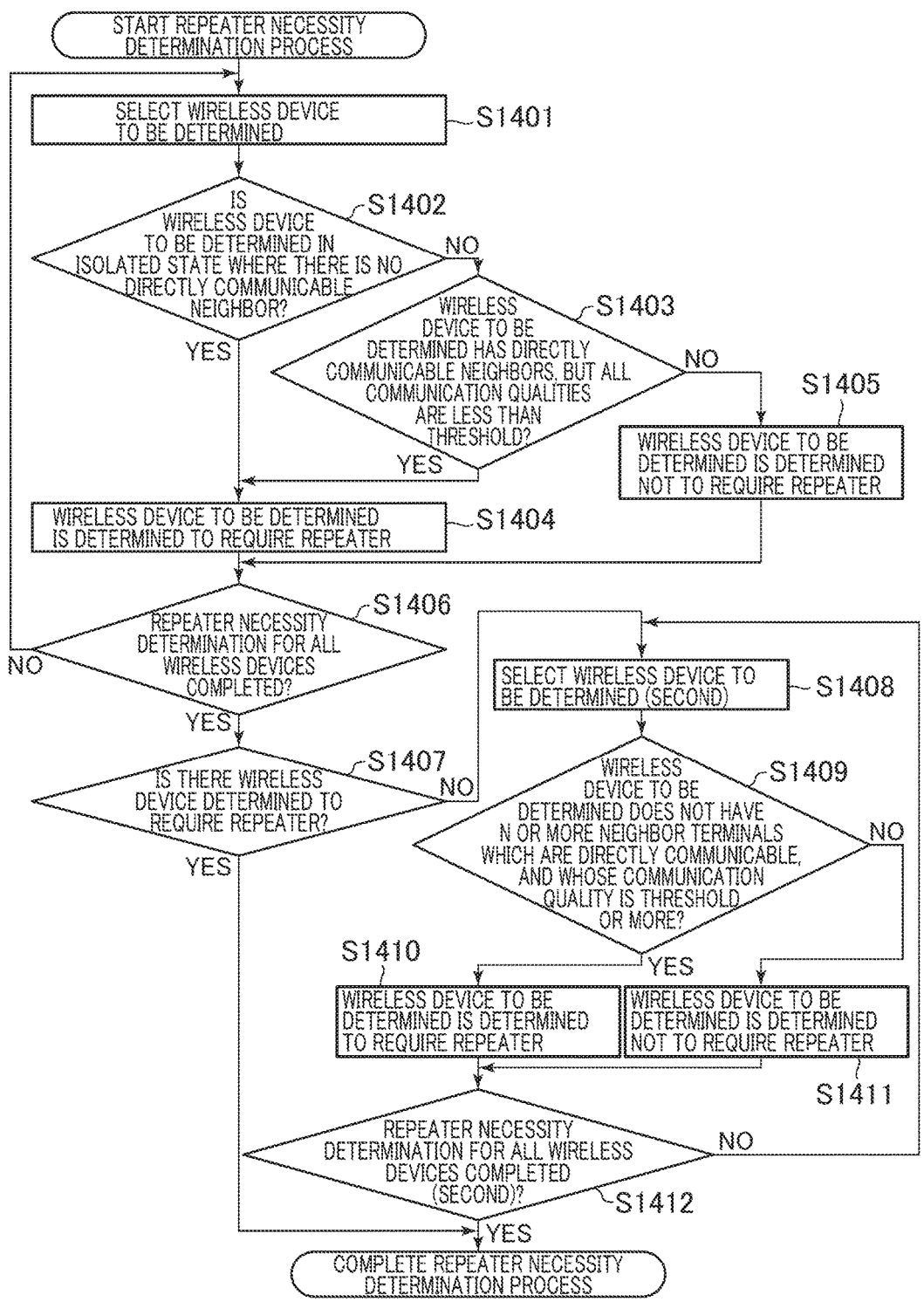
FIG. 14 is a flowchart showing a repeater necessity determination process according to a second embodiment.

In the second embodiment, a repeater necessity determination process is performed by a repeater necessity determination unit 406 in a method different from that in the first embodiment shown in FIG. 9. The repeater necessity determination process according to the second embodiment will be described with reference to FIG. 14. FIG. 14 is a flowchart showing the repeater necessity determination process according to the second embodiment. Various configurations and processes according to the second embodiment are identical with those in the first embodiment except for the repeater necessity determination process, and therefore a description of those configurations and processes will be omitted.

In FIG. 14, Step S1401 is a process of selecting one wireless device 200 to be determined for the necessity of the repeater from all the wireless devices 200. Upon completion of the processing in Step S1401, the process proceeds to Step S1402.

In Step S1402, it is determined whether or not the determination target wireless device 200 is in an isolated state in which there is no neighbor directly communicable by one hop in the periphery of the subject wireless device 200. When the determination target wireless device 200 is in the isolated state (YES), the process proceeds to Step S1404. When the determination target wireless device 200 is not in the isolated state (NO), the process proceeds to Step S1403.

Step S1403 is a process to determine whether or not the communication qualities with neighbors are all less than the threshold value, although there are the neighbors that are directly communicable with the determination target wireless device 200 by one hop. If there is no communicable neighbor whose communication quality is equal to or more than a threshold value (YES), the process proceeds to Step S1404, and if there is a communicable neighbor whose communication quality is equal to or more than the threshold value (NO), the process proceeds to Step S1405.

In Step S1404, the wireless device 200 that satisfies any determination condition of Steps S1402 to S1403 is determined as a wireless device 200 requiring the addition of the repeater. When the processing of Step S1404 is completed, the process proceeds to Step S1406.

In Step S1405, the wireless device 200 that does not meet any of the determination conditions in steps S1402 to S1404 is determined as a wireless device 200 that does not require the addition of the repeater. The repeater can be determined to be unnecessary since the subject wireless device 200 can achieve the predetermined communication requirement without adding the repeater. Upon the completion of the processing in Step S1405, the process proceeds to S1406.

In Step S1406, it is determined whether or not the repeater necessity determination for all of the wireless devices 200 has been completed. If the repeater necessity determination of all the wireless devices 200 has been completed (YES), the process proceeds to Step S1407. If the undetermined wireless devices 200 remain (NO), the process returns to Step S1401 to select the wireless devices 200 that have not been determined as determination targets and the repeater necessity determination process is repeated.

In Step S1407, it is determined whether or not there is the wireless device 200 determined to require the repeater after the completion of the repeater necessity determination for all the wireless devices 200. The wireless devices 200 determined to require the repeater in the processing up to Step S1406 is the wireless device 200 that meets the condition of the above items (1) or (2). If there are the wireless devices 200 determined to require the repeater (YES), since the addition of the repeater to those wireless devices 200 is prioritized, the flowchart of FIG. 14 is completed without confirming whether or not the condition of the above item (3) is satisfied. On the other hand, if there is no the wireless device 200 determined to require the repeater (NO), in order to confirm whether or not the condition of the above item (3) is met, the process proceeds to Step S1408.

Step S1408 is a second process of selecting one wireless device 200 determined for a repeater necessity from all of the wireless devices 200. Upon the completion of the processing in Step S1408, the process proceeds to Step S1409.

Step S1409 is a process of determining whether or not there are N or more wireless devices 200 which are directly communicable with the determination target wireless device 200 by one hop and whose communication quality is equal to or higher than a threshold value. When there are not N or more communicable neighbors whose communication quality is equal to or more than the threshold value (YES), the process proceeds to Step S1410, and when there are N or more communicable neighbor (NO), the process proceeds to Step S1411.

Step S1410 is a process of determining the wireless device 200 that satisfies the determination condition in Step S1409 as the wireless device 200 requiring the addition of the repeater. Upon the completion of the processing in S1410, the process proceeds to Step S1412.

Step S1411 is a process of determining the wireless device 200 that does not satisfy the determination condition in Step S1409 as the wireless device 200 that does not require the addition of the repeater 200. For example, it is assumed that the wireless device 200-F is determined as the wireless device 200 requiring the repeater in Step S1404, and the repeater is placed between the wireless device 200-C and the wireless device 200-F later, whereby the wireless device 200-D can also communicates directly with the repeater with a communication quality equal to or more than the threshold value by one hop. At that time, even if the wireless device 200-D is selected in Step S1408 as the second determination target and N=2 is met in Step S1409, since there are the wireless device 200-C and the repeater disposed between the wireless device 200-C and the wireless device 200-F as the neighbor terminals of the wireless device 200-D, the communication quality of the neighbors terminals being equal to or more than the threshold value, the wireless terminal 200-D is determined as the wireless device 200 not requiring the addition of the repeater. As described above, the repeater addition for the wireless devices 200 corresponding to the above items (1) and (2) is prioritized, as a result of which there is no need to place the repeater between the wireless device 200-D and the gateway 300. According to the present embodiment, the effect of reducing the number of repeaters is expected. When the process of Step S1411 is completed, the process proceeds to Step S1412.

Step S1412 is a second process of determining whether or not the repeater necessity determination for all of the wireless devices 200 has been completed. When the repeater necessity determination of all the wireless devices 200 has been completed (YES), the flowchart in FIG. 14 is completed, and when there are the undetermined wireless devices 200 (NO), the process returns to Step S1408, and the undetermined wireless devices 200 are selected as the determination targets, and the second repeater necessity determination process is repeated.

Incidentally, prioritization is given to the determination conditions of the above items (1) and (2) and the above item (3) by the repeater necessity determination process of FIG. 14. However, as shown in FIG. 13, in the case where the determination target wireless device can be switched to another on the screen, the wireless devices 200 that hold the isolated state and the poor link only are initially selected as the determination targets, and when the wireless devices 200 that meet the above conditions are no longer present, the wireless devices 200 with no predetermined redundancy may be activated as the determination targets. The prioritization in the above items (1) to (3) is not limited to the order shown in the second embodiment, but may be set in a different order.

According to the present embodiment, in the repeater necessity determination for the wireless device 200, the determination is made with priority, thereby being capable of reducing the number of repeaters.

Third Embodiment

In the first and second embodiments, the repeater placement design at the time of network construction has been described. However, even when a communication trouble such as a wireless device failure during a network operation or a local disconnection occurs, it is conceivable that the repeater is added as a disaster recovery measure. Therefore, in a third embodiment, a repeater placement design as a measure against communication troubles occurring during network operation will be described.

In the third embodiment, work support of a wireless network engineering related to a repeater placement design is performed in a method different from that of the first and second embodiments shown in FIG. 6. A flow of the processing according to the third embodiment will be described with reference to FIG. 15. FIG. 15 is a flow chart showing an overall processing of a wireless network engineering support related to a measure against the communication troubles according to the third embodiment. Incidentally, various configurations and processes according to the third embodiment are identical with those in the first embodiment and the second embodiment except for processing shown in FIG. 15, and therefore a description of those configurations and processes will be omitted.

In FIG. 15, Step S1501 is a process in which the network configuration management unit 405 collects information on the neighbor terminal management tables 205 and 305 from the gateway 300 and the wireless devices 200. As in the first and second embodiments, the network management device 400 manages the neighbor terminals communicable with the gateway 300 and the wireless devices 200 and the respective communication qualities as the network configuration information through the network configuration management unit 405. When the processing in Step S1501 is completed, the process proceeds to Step S1502.

In Step S1502, it is detected whether or not a communication trouble has occurred, such as a wireless device failure or a communication disconnection in a specific link etc. A method of detecting the occurrence of the communication trouble may be arbitrarily set according to an application running on the communication system. For example, there is a method based on the fact that the communication quality may fall below a given value in the collected neighbor terminal management table information, or the fact that the collected data management unit 404 of the network management device 400 cannot continuously collect the collected data such as sensor values for a given period. If the occurrence of the communication trouble has been detected (YES), the process proceeds to Step S1503, and if the occurrence of the communication trouble has not been detected (NO), the process returns to Step S1501, and the neighbor terminal management table information is again collected after a given period of time has elapsed. In this way, even during network operation, the neighbor terminal management information is regularly collected, and the configuration information is managed by the network configuration management unit 405 at any time, thereby being capable of monitoring whether the communication trouble occurs.

In Step S1503, the repeater necessity determination unit 406 of the network management device 400 determines whether to add the repeater in each wireless device 200. With the repeater placement design at the time of network construction, if even the wireless device 200 that has satisfied a predetermined communication requirement no longer reaches the communication requirement due to the occurrence of the communication trouble, the wireless device 200 is determined as the wireless device 200 requiring the addition of the repeater in the process of Step S1503. Incidentally, the repeater necessity determination process is the same as that in FIG. 9 of the first embodiment or FIG. 14 of the second embodiment. Upon the completion of the processing in Step S1503, the process proceeds to Step S1504.

In Step S1504, it is determined whether or not there is the wireless device 200 determined to require the addition of the repeater based on the determination result in Step S1503. When there is the wireless device 200 determined to require the repeater addition (YES), the process proceeds to Step S1505. On the other hand, when there is no wireless device 200 (NO), all the wireless devices 200 are capable of achieving the predetermined communication requirement even after the occurrence of the communication trouble, and the addition of the repeater is unnecessary. Therefore, the flowchart of FIG. 15 is completed.

In Step 31505, the access point determination unit 407 of the network management device 400 determines the wireless device 200 or the gateway 300 to be an appropriate access point for each wireless device 200 that is determined to require the repeater in Step S1503. The contents of the access point determination process are the same as those in FIG. 10. When the processing in Step S1505 is completed, the process proceeds to Step S1506.

In Step S1506, the repeater placement determination unit 408 of the network management device 400 determines the installation location of the repeater required for connecting the wireless device 200 determined to require the repeater in Step S1503 to the access point determined in Step S1505. The contents of the repeater placement determination process are the same as those in FIG. 11. When the processing of Step S1506 is completed, the process proceeds to Step S1507.

Step S1507 is a process of outputting the determination result obtained by the repeater placement determination unit 408 in Step S1506 through the display unit 412 of the network management device 400. The worker who performs a measure against the communication trouble can grasp where the wireless device 200 to be the repeater should be additionally installed in trying to recover the communication trouble with reference to the output result. Upon the completion of the processing in Step S1507, the process proceeds to Step S1508.

In Step S1508, the worker installs the wireless device to be the repeater at an actual site based on the determination result of the repeater placement displayed in Step S1507. When the installation is completed, the process proceeds to Step S1509.

Step S1509 is a process of collecting the information of the neighbor terminal management tables 205 and 305 from the gateway 300 and the wireless devices 200 in the same manner as in Step S1501. When the processing in Step S1509 is completed, the process returns to Step S1503 and the repeater necessity determination for each wireless device 200 is again executed. This process is repeated until the wireless devices 200 determined to require the addition of the repeater no longer exist, that is, until the restoration of the communication trouble is completed, thereby being capable of calculating the repeater placement necessary as the measure against the communication trouble.

According to the present embodiment, when a communication trouble occurs in any of the wireless devices 200 during the network operation, the placement portion of the repeater required for the measures against the communication trouble can be calculated and presented.

The present invention is not limited to the embodiments described above, but includes various modifications. For example, the above-mentioned embodiments are described in detail for the purpose of describing the present invention in an easy-to-understand manner. However, the present invention does not always provide all of the configurations described above. Also, in a part of the respective configuration examples, another configuration can be added, deleted, or replaced.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

LIST OF REFERENCE SIGNS

1: communication system, 200: wireless device, 201: storage device, 202: communication processing unit, 203: path management unit, 204: neighbor terminal information management unit, 205: neighbor terminal management table, 206: central control unit, 207: power supply circuit, 208: RF peripheral circuit, 209: input unit, 300: gateway, 301: storage unit, 302: communication processing unit, 303: route management unit, 304: neighbor terminal information management unit, 305: neighbor terminal management table, 306: central control unit, 307: power supply circuit, 308: RF peripheral circuit, 309: external network connection circuit, 400: network management device, 401: storage device, 402: communication processing unit, 403: route management unit, 404: collected data management unit, 405: a network configuration management unit, 406: a repeater necessity determination unit, 407: access point determination unit, 408: a repeater placement determination unit, 409: central control unit, 410: power supply circuit, 411: external network connection circuit, 412: display unit

The invention claimed is:

1. A communication system comprising: a plurality of wireless devices; a gateway that transmits and receives information with respect to each of the wireless devices; and a network management device that manages a wireless multi-hop network including the wireless devices and the gateway, the network management device including:

a network configuration management unit that manages communication quality information between the wireless devices and between the wireless devices and the gateway;

a repeater necessity determination unit that determines whether or not to add a repeater for each of the wireless devices based on the communication quality information and selects the wireless device that is required to add the repeater based on a determination result;

an access point determination unit that determines access points for securing a predetermined communication quality for the wireless device selected by the repeater necessity determination unit based on the communication quality information or positional information of the wireless devices and the gateway to select the access point from the wireless devices or the gateway based on the determination result; and a repeater placement determination unit that determines whether there is a repeater installation location indicating an installation range of the repeater for relaying the wireless device selected by the repeater necessity determination unit and the access point selected by the access point determination unit based on a communication range of the wireless device selected by the repeater necessity determination unit and a communication range of the access point selected by the access point determination unit.

2. The communication system according to claim 1, wherein the repeater necessity determination unit selects, as the wireless device required to add the repeater, the wireless device that is in an isolated state where there is no communication target which is directly communicable by one hop, the wireless device having no communication target which is directly communicable by one hop and whose communication quality is equal to or more than a threshold value, or a wireless device having one or more communication targets which are directly communicable by one hop and whose communication quality is equal to or more than the threshold value, but the number of which is less than N (N is any value of 1 or more).

3. The communication system according to claim 1, wherein the access point determination unit selects, as the access point, another wireless device or the gateway, which is closest from the wireless devices selected by the repeater necessity determination unit, another wireless device or the gateway, which is highest in communication quality among the communication targets directly communicable with the wireless devices selected by the repeater necessity determination unit by one hop, another wireless device or the gateway, which is closest from the wireless device selected by the repeater necessity determination unit except for the communication target directly communicable with the wireless devices selected by the repeater necessity determination unit by one hop and whose communication quality is equal to or more than a threshold value, or another wireless device or the gateway, which is highest in communication quality among the communication targets directly communicable with the wireless devices selected by the repeater necessity determination unit by one hop except for the communication target directly communicable with the wireless devices selected by the repeater necessity determination unit by one hop and whose communication quality is equal to or more than a threshold value.

4. The communication system according to claim 1, wherein when there is an overlapping portion indicating an area in which a communication range of the wireless device selected by the repeater necessity determination unit and a communication range of the access point selected by the access point determination unit overlap with each other, the repeater placement determination unit determines that there is the repeater placement location, and outputs the overlapping portion as the repeater installation location.

5. The communication system according to claim 1, wherein the repeater placement determination unit determines that there is the repeater installation location when, with a pair of the wireless device selected by the repeater necessity determination unit and the access point selected by the access point determination unit, there is a further overlapping area in which a first overlapping portion indicating an area in which communication ranges of the pair overlap with each other overlaps with a second overlapping portion indicating an area in which communication ranges of another pair overlap with each other, and outputs the further overlapping area as the repeater installation location which is a third overlapping portion common to both of the pairs.

6. The communication system according to claim 1, wherein the repeater placement determination unit virtually places one or more virtual terminals between the wireless device selected by the repeater necessity determination unit and the access point selected by the access point determination unit when there is no overlapping portion indicating an area in which a communication range of the wireless device selected by the repeater necessity determination unit and a communication range of the access point selected by the access point determination unit overlap with each other, and determines that there is the repeater installation location and outputs the first virtual overlapping portion and the second virtual overlapping portion as the repeater installation locations when there are a first virtual overlapping portion indicating an area in which the communication range of the wireless device selected by the repeater necessity determination unit and a communication range of the virtual terminal overlap with each other, and a second virtual overlapping portion indicating an area in which the communication range of the access point selected by the access point determination unit and the communication range of the virtual terminal overlap with each other.

7. The communication system according to claim 1, wherein the repeater necessity determination unit preferentially selects the wireless device which is in an isolated state in which there is no communication target directly communicable by one hop or the wireless device having no communication target directly communicable by the one hop and whose communication quality is equal to or more than a threshold value as the wireless device required to add the repeater, and selects one or more wireless devices having the communication target which is directly communicable by the one hop and whose communication quality is equal to or more than the threshold value, and the number of which is less than N (N is any value of 1 or more) as the wireless device required to add the repeater only when there is no wireless device satisfying the condition.

8. The communication system according to claim 1, further comprising a display unit that displays the communication quality information managed by the network configuration management unit and the repeater placement location which is a determination result of the repeater placement determination unit in association with the wireless devices belonging to the wireless multi-hop network and the gateway.

9. A wireless network engineering support method in a network management device that manages a plurality of wireless devices and a gateway that transmits and receives information with respect to each of the wireless devices, comprising:
   a first step of managing communication quality information between the wireless devices and between the wireless devices and the gateway;
   a second step of determining whether or not to add a repeater for each of the wireless devices based on the communication quality information and selecting the wireless device that is required to add the repeater based on a determination result;
   a third step of determining access points for securing a predetermined communication quality for the wireless device selected in the second step based on the communication quality information or positional information of the wireless devices and the gateway to select the access point from the wireless devices or the gateway based on the determination result; and
   a fourth step of determining whether or not there is a repeater installation location indicating an installation range of the repeater for relaying the wireless device selected in the second step and the access point selected in the third step based on the communication range of the wireless device selected in the second step and the communication range of the access point selected in the third step.

10. The wireless network engineering support method according to claim 9,
   wherein in the second step, the wireless device that is in an isolated state where there is no communication target which is directly communicable by one hop, the wireless device having no communication target which is directly communicable by one hop and whose communication quality is equal to or more than a threshold value, or a wireless device having one or more communication targets which are directly communicable by one hop and whose communication quality is equal to or more than the threshold value, but the number of which is less than N (N is any value of 1 or more) is selected as the wireless device required to add the repeater.

11. The wireless network engineering support method according to claim 9,
   wherein, in the third step, another wireless device or the gateway, which is closest from the wireless devices selected in the second step, another wireless device or the gateway, which is highest in communication quality among the communication targets directly communicable with the wireless devices selected in the second step by one hop, another wireless device or the gateway, which is closest from the wireless device selected in the second step except for the communication target directly communicable with the wireless devices selected in the second step by one hop and whose communication quality is equal to or more than a threshold value, or another wireless device or the gateway, which is highest in communication quality among the communication targets directly communicable with the wireless devices selected in the second step by one hop except for the communication target directly communicable with the wireless devices selected in the second step by one hop and whose communication quality is equal to or more than a threshold value is selected as the access point.

12. The wireless network engineering support method according to claim 9,
   wherein in the fourth step, when there is an overlapping portion indicating an area in which a communication range of the wireless device selected in the second step and a communication range of the access point selected in the third step overlap with each other, it is determined that there is the repeater placement location, and the overlapping portion is output as the repeater installation location.

13. The wireless network engineering support method according to claim 9,
   wherein in the fourth step, with a pair of the wireless device selected in the second step and the access point selected in the third step, when there is a further overlapping area in which a first overlapping portion indicating an area in which communication ranges of the pair overlap with each other overlaps with a second overlapping portion indicating an area in which communication ranges of another pair overlap with each other, it is determined that there is the repeater installation location and the further overlapping area is output as the repeater installation location which is a third overlapping portion common to both of the pairs.

14. The wireless network engineering support method according to claim 9,
   wherein in the fourth step, one or more virtual terminals are virtually placed between the wireless device selected in the second step and the access point selected in the third step when there is no overlapping portion indicating an area in which a communication range of the wireless device selected in the second step and a communication range of the access point selected in the third step overlap with each other, and it is determined that there is the repeater installation location and the first virtual overlapping portion and the second virtual overlapping portion are output as the repeater installation locations when there are a first virtual overlapping portion indicating an area in which the communication range of the wireless device selected in the second step and a communication range of the virtual terminal overlap with each other, and a second virtual overlapping portion indicating an area in which the communication range of the access point selected in the third step and the communication range of the virtual terminal overlap with each other.

15. The wireless network engineering support method according to claim 9,
   wherein in the second step, the wireless device which is in an isolated state in which there is no communication target directly communicable by one hop or the wireless device having no communication target directly communicable by the one hop and whose communication quality is equal to or more than a threshold value is preferentially selected as the wireless device required to add the repeater, and only when there is no wireless device satisfying the condition, one or more wireless devices having the communication target which is directly communicable by the one hop and whose communication quality is equal to or more than the threshold value, and the number of which is less than N (N is any value of 1 or more) are selected as the wireless device required to add the repeater.

* * * * *